US011457184B2

(12) United States Patent
Nakabayashi et al.

(10) Patent No.: US 11,457,184 B2
(45) Date of Patent: Sep. 27, 2022

(54) INFORMATION PROCESSING APPARATUS AND INFORMATION PROCESSING METHOD

(71) Applicant: TOYOTA JIDOSHA KABUSHIKI KAISHA, Toyota (JP)

(72) Inventors: Ryota Nakabayashi, Toyota (JP); Naoki Yamada, Toyota (JP); Daigo Fujii, Tsushima (JP); Atsushi Ikegaya, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/182,689

(22) Filed: Feb. 23, 2021

(65) Prior Publication Data
US 2021/0281804 A1 Sep. 9, 2021

(30) Foreign Application Priority Data
Mar. 4, 2020 (JP) .............................. JP2020-036742

(51) Int. Cl.
*H04N 7/18* (2006.01)
*B60R 25/30* (2013.01)
*B60R 25/20* (2013.01)
*G01C 21/36* (2006.01)
*B60R 25/31* (2013.01)
(Continued)

(52) U.S. Cl.
CPC ............. *H04N 7/188* (2013.01); *B60R 25/20* (2013.01); *B60R 25/305* (2013.01); *B60R 25/31* (2013.01); *G01C 21/36* (2013.01); *G06V 20/586* (2022.01); *H04W 4/024* (2018.02)

(58) Field of Classification Search
CPC ....... B60R 25/20; B60R 25/305; B60R 25/31; B60R 25/33; B60R 25/30; B60R 25/1001; B60R 25/1003; B60R 2025/1013; B60R 25/104; G01C 21/36; G06K 9/00812; G06K 9/00791; H04N 7/188; H04N 7/185; H04N 5/23206; H04N 5/232061; H04N 7/181; G08B 13/19602; G08B 13/1961; G08B 13/19608; G08B 13/19606; G08B 13/19647; G08B 13/19656;
(Continued)

(56) References Cited

U.S. PATENT DOCUMENTS

| 10,176,718 | B1* | 1/2019 | Mazuir | .................. G08G 1/123 |
| 2013/0342333 | A1* | 12/2013 | Hutchings | .............. G08B 25/10 340/435 |
| 2021/0006754 | A1* | 1/2021 | Seaman | .................. H04N 7/181 |

FOREIGN PATENT DOCUMENTS

| JP | 2018-156251 A | 10/2018 |
| JP | 2018156251 A | * 10/2018 |

* cited by examiner

*Primary Examiner* — Nathnael Aynalem
(74) *Attorney, Agent, or Firm* — Sughrue Mion, PLLC

(57) ABSTRACT

An information processing apparatus includes a controller. The controller is configured to execute: acquiring a presence or an absence of a predetermined input from the outside to parked vehicles parked in a predetermined parking area in which a plurality of vehicles are parked, identifying a vehicle target vehicle for which the predetermined input is made among the parked vehicles, and issuing a command for activating a first vehicle sensor configured to detect a peripheral information of a first vehicle and provided to the first vehicle based on the predetermined input to target vehicle, the first vehicle being a vehicle parked around target vehicle in the predetermined parking area.

10 Claims, 26 Drawing Sheets

(51) Int. Cl.
*H04W 4/024* (2018.01)
*G06V 20/58* (2022.01)
(58) Field of Classification Search
CPC .. G08B 13/19658; G08G 1/205; G08G 1/123; H04W 4/024
USPC .......................................................... 348/148
See application file for complete search history.

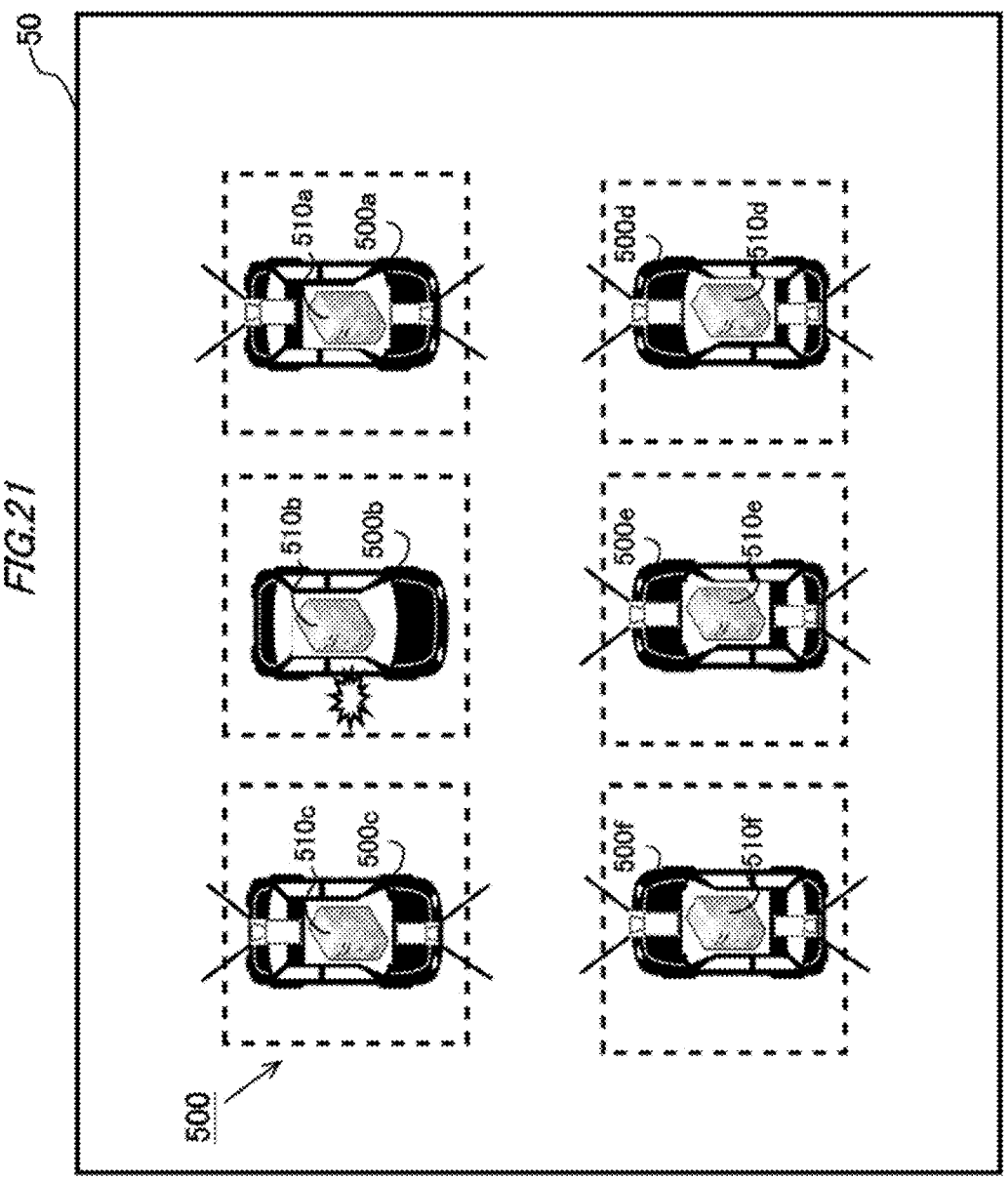

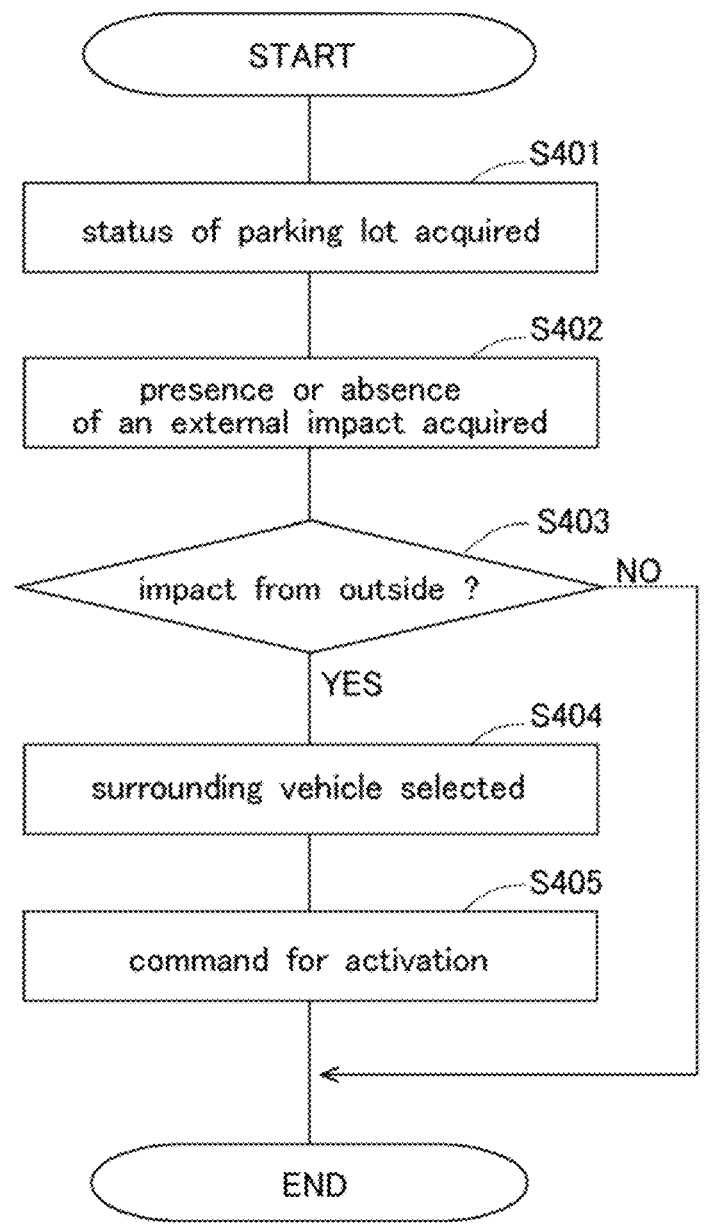

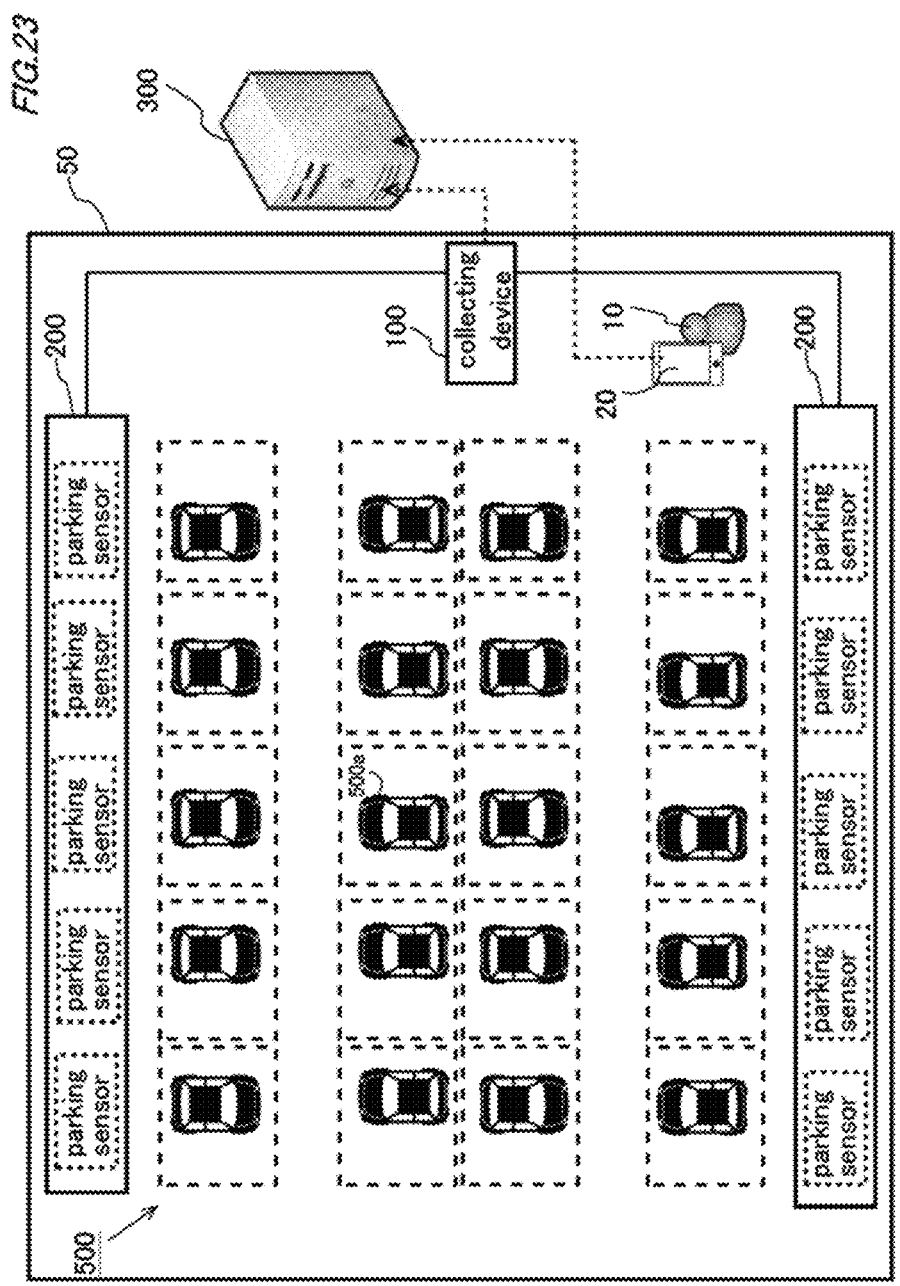

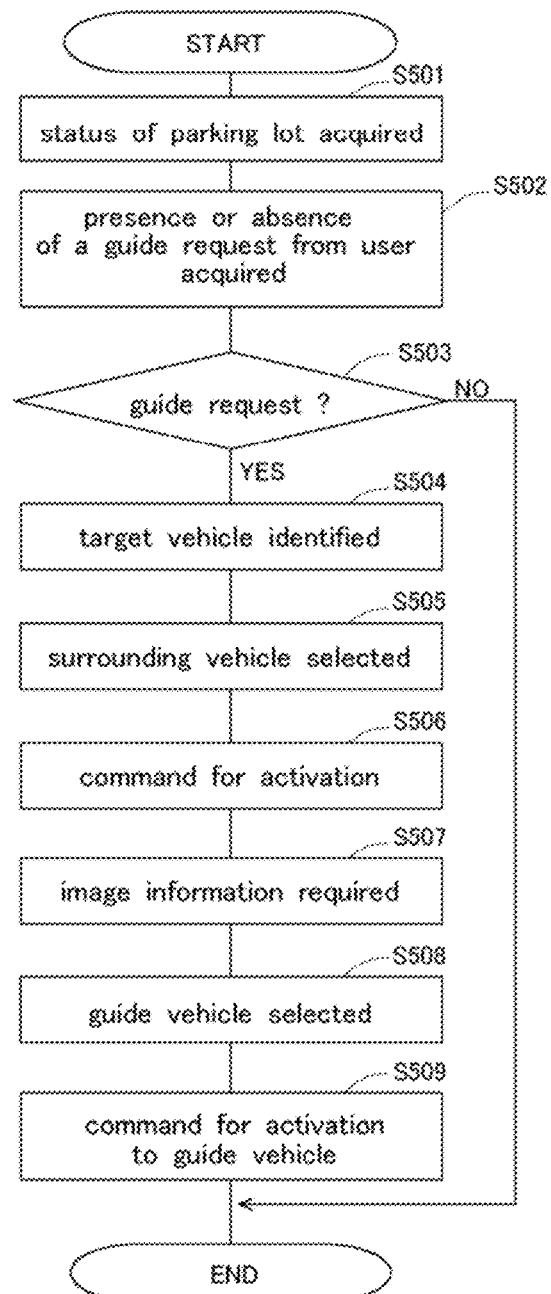

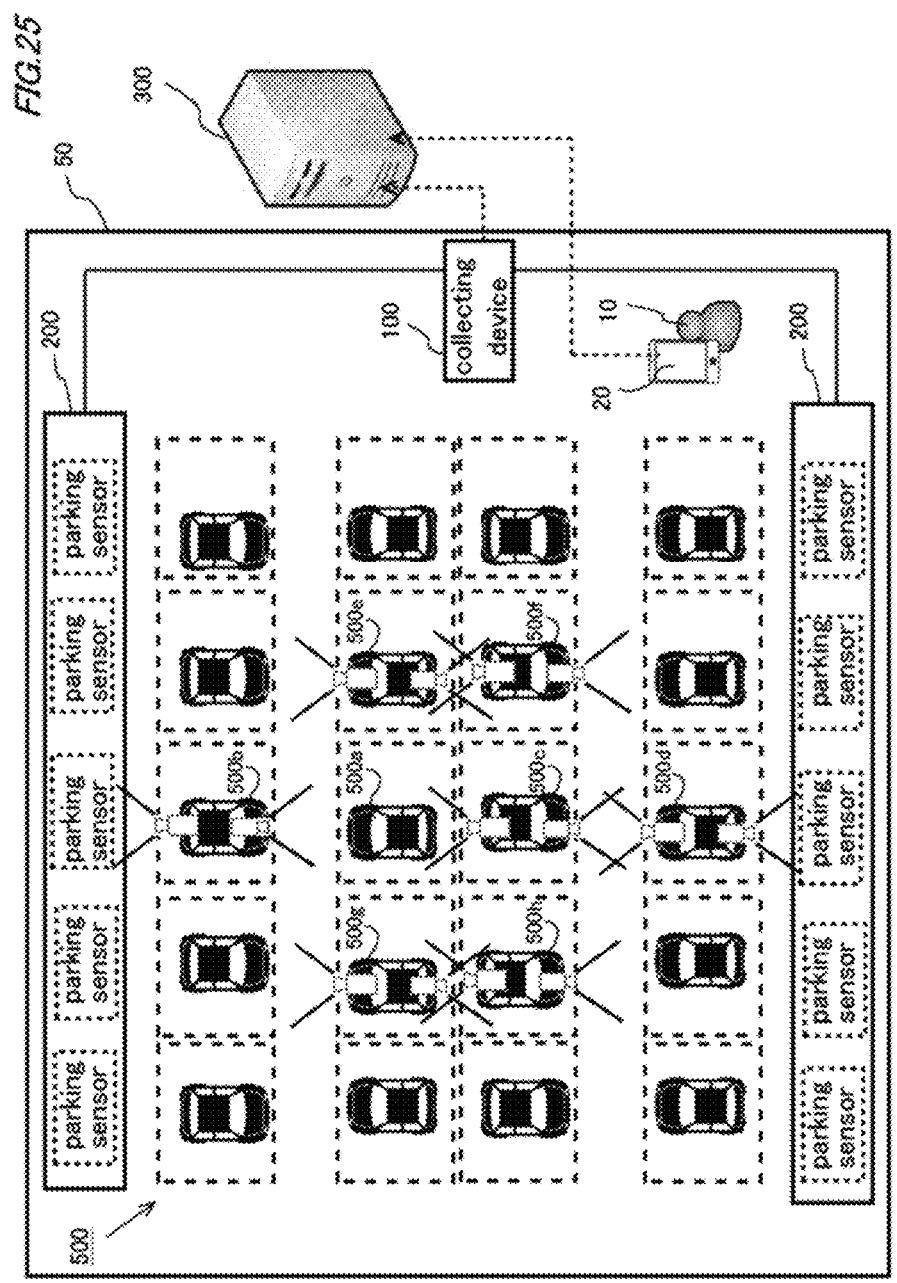

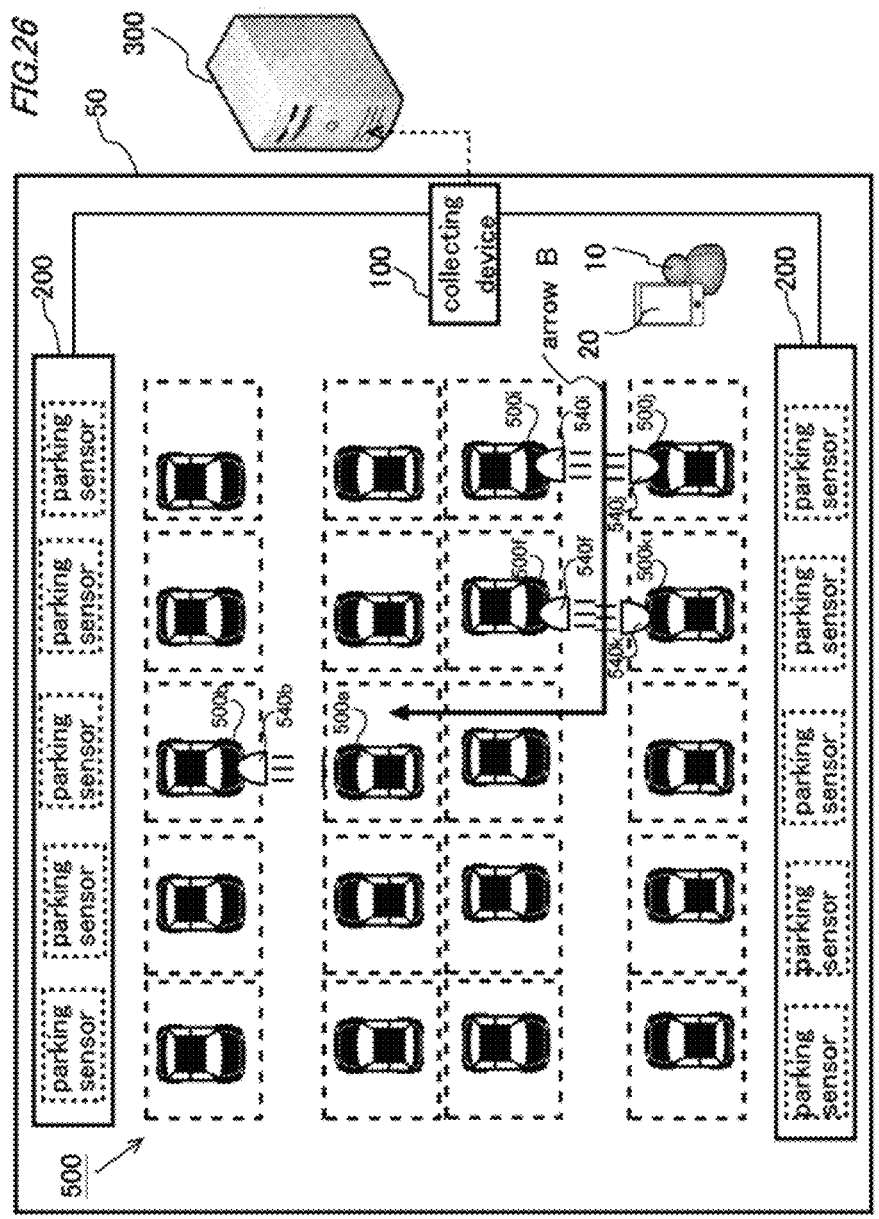

INFORMATION PROCESSING APPARATUS AND INFORMATION PROCESSING METHOD

CROSS-REFERENCE TO RELATED APPLICATIONS

This application is based upon and claims the benefit of priority of the prior Japanese Patent Application No. 2020-36742, filed on Mar. 4, 2020, which is hereby incorporated by reference herein in its entirety.

FIELD

The present invention relates to an information processing apparatus and an information processing method.

BACKGROUND

Patent Document 1, when guiding the position of the vehicle to the vehicle user, a technique relating to a vehicle position guiding system vehicle surrounding monitoring function is activated in the vehicle terminal installed in the vehicle is disclosed. According to this technique, when a vehicle use requests guidance of a vehicle position using a communication terminal, a security system of the vehicle is activated. Therefore, when the parking position of the vehicle is guided to the vehicle user, a situation in which the user hits the suspicious person is suppressed.

[Patent Document 1] Japanese Patent Application Laid-Open Publication No. 2018-156251

SUMMARY

It is an object of the present invention to provide an information processing apparatus and an information processing method capable of suitably monitoring the parking area in a predetermined parking area in which a plurality of vehicles are parked.

The disclosed information processing apparatus comprises a controller, and the controller is configured to execute: acquiring a presence or an absence of a predetermined input from the outside to parked vehicles parked in a predetermined parking area in which a plurality of vehicles are parked, identifying a target vehicle for which the predetermined input is made among the parked vehicles, and issuing a command for activating a first vehicle sensor configured to detect a peripheral information of a first vehicle and provided to the first vehicle based on the predetermined input to the target vehicle, the first vehicle being a vehicle parked around the target vehicle in the predetermined parking area.

The information processing apparatus of the present disclosure includes a controller, and the controller is configured to execute: acquiring a presence or an absence of a predetermined input from the outside in a target vehicle which is a predetermined vehicle parked in a predetermined parking area in which a plurality of vehicles are parked, and issuing a command for activating a first vehicle sensor which is configured to be capable of detecting peripheral information of a first vehicle and is provided in the first vehicle based on the predetermined input to the target vehicle, the first vehicle being a vehicle parked around the target vehicle in the predetermined parking area.

The information processing method of the present disclosure includes acquiring a presence or an absence of a predetermined input from the outside to parked vehicles parked in a predetermined parking area in which a plurality of vehicles are parked; identifying a target vehicle, which is a vehicle for which the predetermined input is made, among the parked vehicles; and issuing, based on the predetermined input to the target vehicle, a command for activating a first vehicle sensor configured to be capable of detecting peripheral information of the first vehicle and provided to the first vehicle, the first vehicle being a vehicle parked around target vehicle in the predetermined parking area.

According to the present disclosure, it is possible to suitably monitor the parking area in a predetermined parking area in which a plurality of vehicles are parked.

BRIEF DESCRIPTION OF THE DRAWINGS

FIG. 21 is a diagram for explaining a monitoring of the parking lot in the second embodiment.

FIG. 22 is a flowchart for starting processing of the vehicle-mounted camera by the on-board device the second embodiment.

FIG. 23 is a diagram showing a schematic configuration of an information processing system in the third embodiment.

FIG. 24 is a flowchart for the processing of guidance to the user by the server in the third embodiment.

FIG. 25 is a first diagram for explaining the monitoring of the parking lot in the third embodiment.

FIG. 26 is a second diagram for explaining the monitoring of the parking lot the third embodiment.

DETAILED DESCRIPTION

A controller acquires the presence or absence of predetermined inputs from outside to a parked vehicle parked in a predetermined parking area in which a plurality of vehicles are parked. Here, the predetermined input from the outside, for example, is an impact from the outside to the vehicle. Then, when an impact is applied from the outside in this way to the vehicle, there is a possibility that an abnormality occurs in the vehicle. The predetermined inputs from the outside are, for example, predetermined requests from the user of parked vehicles. If this request is, for example, a guidance request from the user to his or her own parked vehicles, and if the guidance to the user is inappropriate, the parking area may be compromised.

Therefore, a controller, based on a predetermined input to a target vehicle that is a predetermined vehicle being parked in a predetermined parking area, issues a command for activating the first vehicle sensor. Here, when an information processing apparatus of the present disclosure is an apparatus which is not mounted on a vehicle, a controller of the apparatus identifies the vehicle, from among the parked vehicles, which has received a predetermined entry, as a target vehicle. When the information processing apparatus disclosed in the present disclosure is an in-vehicle device mounted on a vehicle, the controller of the in-vehicle device acquires the presence or absence of predetermined inputs from the outside using the vehicle itself as a target vehicle. Then, the controller of the present disclosure starts a first vehicle sensor provided in a first vehicle, the vehicle parked around a target vehicle in a predetermined parking area being the first vehicle. Here, the first vehicle sensor is a sensor configured to be capable of detecting peripheral information of the first vehicle, for example, an vehicle-mounted camera.

Thus, according to the disclosed information processing apparatus, a first vehicle sensor of a first vehicle parked around a target vehicle is activated based on predetermined inputs to the target vehicle. Then, when the predetermined input from the outside is an impact from the outside on the vehicle, the first vehicle sensor can accurately grasp the situation in which the impact is applied to a target vehicle from the outside, and thus the parking lot can be suitably monitored. When a predetermined input from the outside is, for example, a user's request for guidance to his/her own parked vehicles, the first vehicle sensor enables the user to be suitably guided to his/her own vehicle, thereby enhancing the security of the parking lot.

Embodiments of the present disclosure will be described below with reference to the drawings. The configuration of the following embodiment is exemplary, and the present disclosure is not limited to the configuration of the embodiment.

First Embodiment

Figure 1:
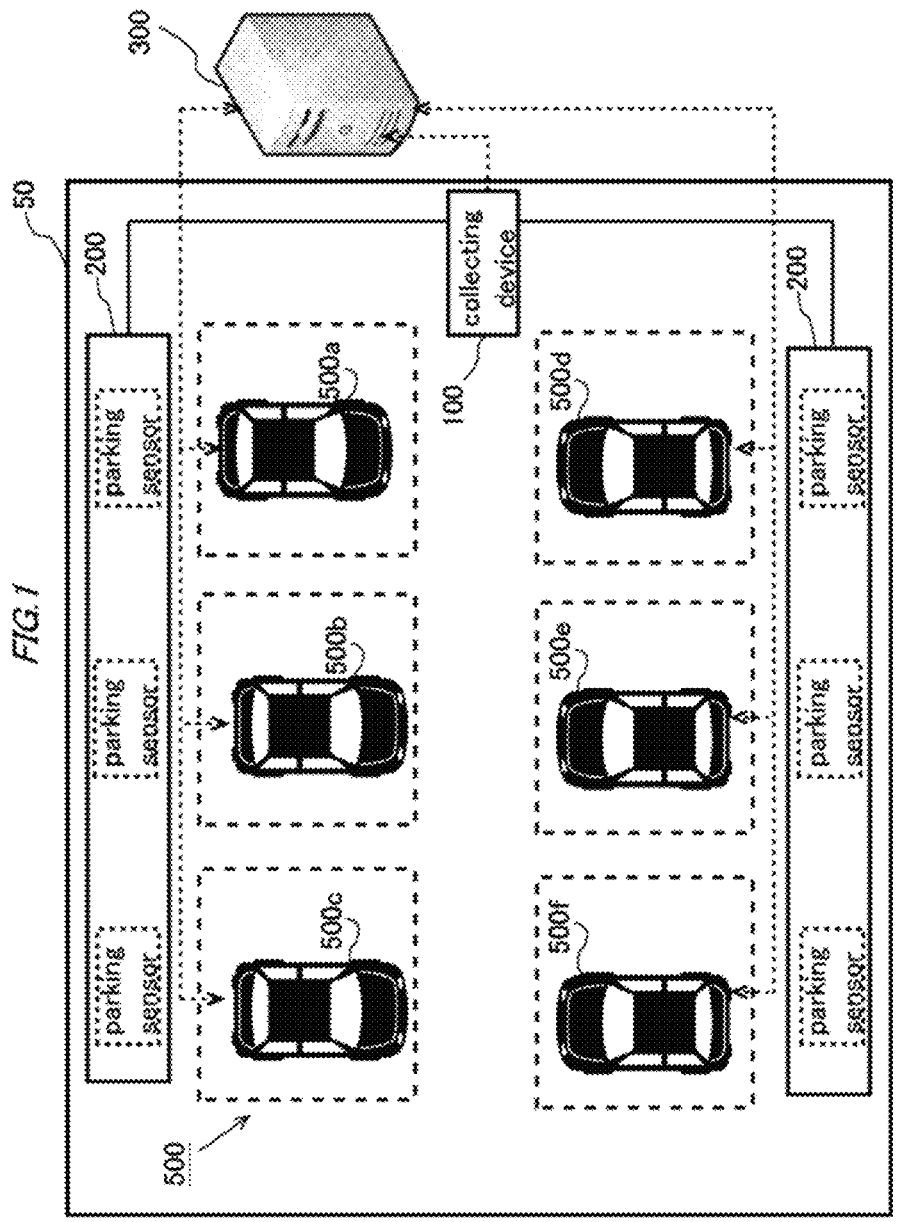
FIG. 1 is a diagram showing a schematic configuration of an information processing system according to a first embodiment.

An outline of an information processing system according to the first embodiment will be described referring to FIG. 1. The information processing system according to the present embodiment includes a collecting device 100 having jurisdiction of a parking lot 50, a parking sensor 200 including a sensor for sensing the parking status of the vehicle in the parking lot 50, and a server 300. In the present embodiment, as shown in FIG. 1, six vehicles 500a to 500f are parked in the parking lot 50 as the vehicle 500.

Collecting device 100 is a device installed in parking lot 50 and collects data detected by a parking sensor 200. The data collection from parking sensor 200 by collecting device 100 may be such that the data temporarily stored in the sensor is collected at a predetermined cycle, or may be such that the detected data transmitted from the sensor in a push-type manner is collected each time.

Parking sensor 200 includes a vehicle detection sensor. Vehicle detection sensor is a sensor for detecting the presence of the vehicle 500 parked in each parking position of the parking lot 50. The vehicle detection sensor may be an infrared type sensor or an ultrasonic type sensor.

Parking sensor 200 may also include an identification sensor. An identification sensor detects the identification information of the vehicle 500 parked in the parking lot 50. Specifically, by performing short-range wireless communication with the vehicle 500, it detects the identification information of the vehicle 500. The identification information of the vehicle 500 is registered in advance in the in-vehicle device 510 of the vehicle 500 by a predetermined application. Such identification sensors can also sense the parking situation of the vehicle in the parking lot 50. The type of the sensor included in the parking sensor 200 can vary, as long as it can sense the parking status of the vehicle in the parking lot 50.

The server 300 is configured to be able to communicate with collecting device 100 to retrieve detected data transmitted from the collecting device 100. The server 300 manages the parking status of the vehicle 500 in the parking lot 50 by acquiring the detected data transmitted from collecting device 100. The server 300 is configured to be able to communicate with vehicle 500. The server 300 can acquire data transmitted from the vehicle 500 and transmit a predetermined command to the vehicle 500.

The server 300 is also connected to other servers via networks and is configured to be the accessible to databases for identifying the vehicles 500 parked in the parking lot 50. Therefore, the server 300 can identify the vehicle 500 parked in the parking lot 50 based on the detected data transmitted from collecting device 100 and the information stored the database. For example, if the identification sensor is used as the parking sensor 200, the server 300 verifies the identification information of the vehicle 500 transmitted from collecting device 100 and the information stored in the database, and the parked vehicle 500 in the parking lot 50 is identified. Further, for example, when the vehicle detection sensor is used as parking sensor 200, the server 300 includes a vehicle detection information transmitted from collecting, device 100, and information stored in the database, and further predetermined data is transmitted from the vehicle 500 parked in the parking lot 50. In this case, positional information, identification information, and the like are transmitted from the vehicle 500. Then, the server 300 collates the identification information of the vehicle 500 transmitted from the vehicle 500 with the information stored in the data base to identify the vehicle 500. Furthermore, the server 300 by checking the position information of the vehicle 500 transmitted from the vehicle 500 and the vehicle detection information transmitted from collecting device 100, acquires the parking position of the identified vehicle 500.

Then, the server 300 acquires the presence or absence of a predetermined input from the outside to the vehicle 500 parked in the parking lot 50. As described above, the server 300 is configured to be able to communicate with the vehicle 500. In the present embodiment, when the vehicle 500 (e.g., the vehicle 500b in FIG. 1) detects an external impact to the vehicle (the vehicle 500b), the fact is transmitted from the vehicle (the vehicle 500b) together with the position information and identification information of the vehicle (the vehicle 500b) to the server 300. The server 300 acquires data transmitted from the vehicle 500 in this manner, thereby acquiring the presence or absence of a predetermined input from the outside to the vehicle 500. Further, the server 300 may identify a predetermined target vehicle (vehicle 500b) from among the vehicles 500 parked in the parking lot 50 based on the data transmitted from the vehicle 500 and the vehicle data stored in the other servers.

In this manner, the server 300 that acquires the fact that a predetermined input has been made to the vehicle 500, and the server 300 that has specified the vehicle transmits a predetermined command to surrounding vehicle (the vehicle 500a, the vehicle 500c, the vehicle 500d, the vehicle 500e, and the vehicle 500f) parked around target vehicle (the vehicle 500b) in which the predetermined input has been made in the parking lot 50. Here, the vehicle 500 is provided with a sensor configured to be capable of detecting peripheral information of the vehicle 500. The server 300 issues a command to activate the sensor of the above surrounding vehicle. The sensor is, for example, a vehicle-mounted camera constituting a drive recorder, but it is not intended to be limited thereto. The sensor may be of any type as long as it can sense peripheral information of the vehicle 500.

Figure 2:
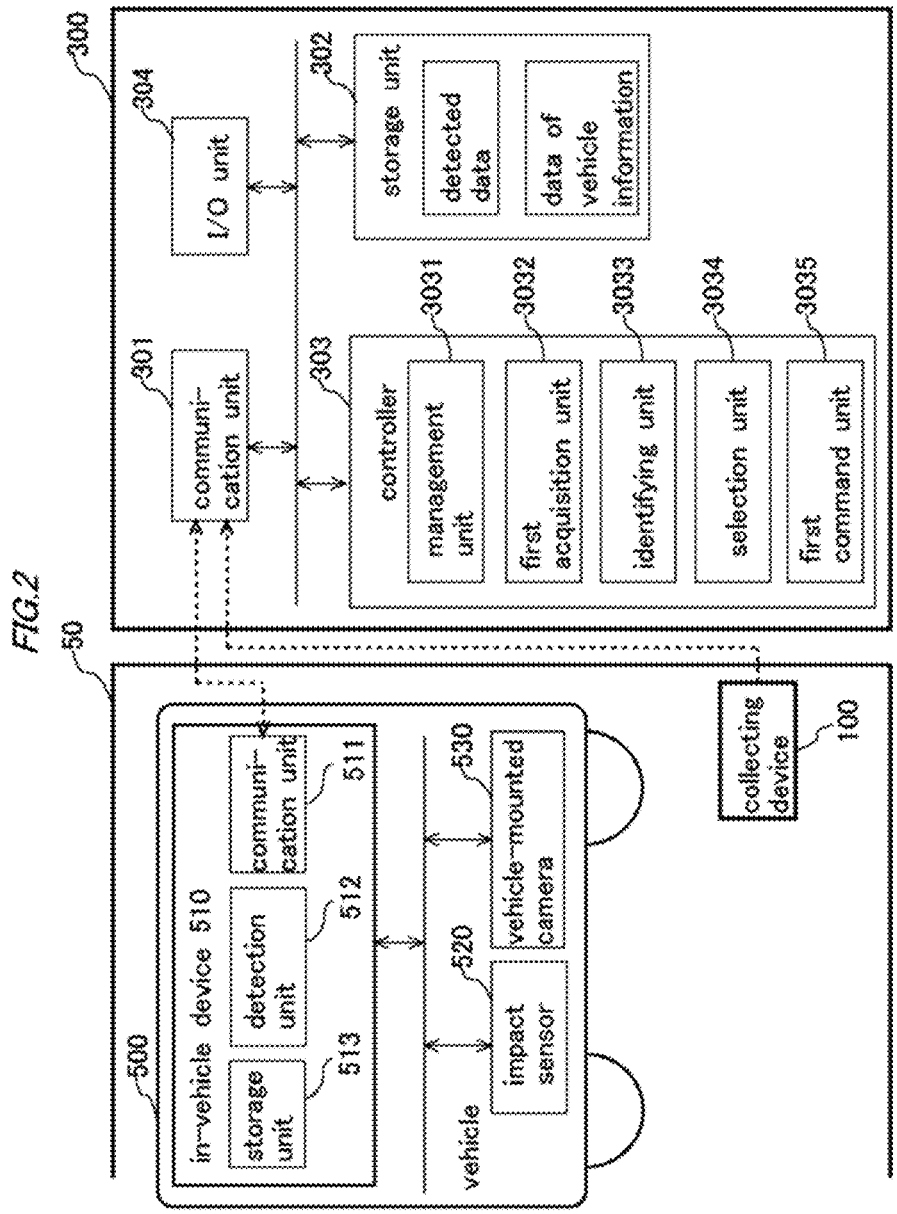
FIG. 2 is a diagram showing components of an information processing system according to a first embodiment in more detail.

Next, the components of the server 300 will be mainly described in detail with reference to FIG. 2. FIG. 2 is a diagram showing in more detail the components of the server 300 included in the information processing system and the components of the vehicle 500 that communicates with the server 300 according to the first embodiment.

Server 300 may be comprised of a general purpose computer. That is, the server 300 may be configured as a computer having a processor such as a CPU or a GPU, a main storage device such as a RAM or a ROM, a EPROM, a hard disk drive, and an auxiliary storage device such as a removable medium. The removable media may be, for example, a USB memory or a disc recording medium such as a CD or DVD. The auxiliary storage device stores an operating system (OS), various programs, various tables, and the like. The server 300 includes a communication unit 301, a storage unit 302, a controller 303, and a input/output unit 304 as functional units. The server 300 loads the program stored in the auxiliary storage device into the work area of the main storage device and executes the program, and the respective functional units are controlled through the execution of the program, so that each function corresponding to a predetermined purpose of each functional unit can be realized. However, some or all of the functions may be realized by hardware circuits such as a ASIC and a FPGA.

Here, communication unit 301 is a communication interface for connecting the server 300 to a network. Communication unit 301 includes, for example, a network interface board and wireless communication circuits for wireless communication. The server 300 is communicably connected to the vehicle 500 and other external devices via communication unit 301.

Storage unit 302 includes a main storage device and an auxiliary storage device. The main memory device is a memory in which a program executed by controller 303 or data used by the control program is expanded. The auxiliary storage device is a device in which a program executed in controller 303 and data used by the control program are stored.

Further, storage unit 302 stores the detected data transmitted from the collecting device 100 and the data relating to the vehicle data transmitted from the vehicle 500. The server 300 acquires these data via communication unit 301. The detection data stored in the storage unit 302 is, for example, vehicle detection information detected by a vehicle detection sensor. The data related to the vehicle information stored in storage unit 302 is, for example, the position information and the identifying information of the vehicle transmitted from the vehicle 500.

Controller 303 is a functional unit that controls the servers 300. Controller 303 can be realized by a processor such as a central processing unit (CPU).

Controller 303 further includes five functional units: a management unit 3031, a first acquisition unit 3032, an identifying unit 3033, a selection unit 3034, and a first command unit 3035. Each functional unit may be realized by executing a stored program by the CPU.

A management unit 3031 based on the detection information of the vehicle in the parking lot 50 stored in storage unit 302 transmitted from collecting device 100, manages the parking status of the vehicle in the parking lot 50. Here, the parking status of the vehicle, for example, is a status relating to the presence or absence of parked vehicles at the respective parking positions of the parking lot 50. Furthermore, the management unit 3031, if parked vehicles are present, based on the data relating to the vehicle information of the parked vehicles stored in storage unit 302 transmitted, from the vehicle 500, the parked vehicle 500 in each parking position of the parking lot 50 used in identifying, manages the parking status of the vehicle in the parking lot 50. As described above, the data relating to the vehicle information stored in storage unit 302 includes the vehicle position information, the identification information, and the like transmitted from the vehicle 500. The server 300 is also connected to other servers via a network and is configured to allow the vehicle to be accessible to a database for identifying. Therefore, management unit 3031 can identify the vehicle 500 by comparing the identification information of the vehicle 500 parked in the parking lot 50 with the vehicle information stored in other servers. Further, management unit 3031 includes a position information of the vehicle 500 parked in the parking lot 50, and by collating the detection information of the vehicle in the parking lot 50, it is possible to manage the parking position of the identified vehicle 500.

The first acquisition unit 3032 acquires the presence or absence of an external impact to the vehicle 500 based on data transmitted from the vehicle 500 to the server 300 when the vehicle 500 detects an impact. This will be described below together with the components of the vehicle 500.

Vehicle 500 includes an in-vehicle device 510, an impact sensor 520, and an vehicle-mounted camera 530. The in-vehicle device 510 includes a communication unit 511, a detection unit 512, and a storage unit 513 as functional units, but may include other functional units. Communication unit 511 is a communication interface for connecting the vehicle 500 to a network, and includes, for example, a network interface board and wireless communication circuits for wireless communication. Detection unit 512 is a functional unit for detecting the position of the vehicle 500, for example, and is formed with a GPS device. Storage unit 513 is configured to include a main storage device and an auxiliary storage device as well as storage unit 302 of the server 300. Storage unit 513 stores the identity of the vehicle 500. The identification information is registered in advance by a predetermined application.

Impact sensor 520 is a mechanical or electronic sensor that senses the impact acting on the vehicle 500 and outputs the sensed signal, for example, provided on the vehicle body of the vehicle 500. An exemplary impact sensor 520 is an accelerometer. Impact sensor 520 detects the acceleration generated in the parked vehicle 500 as an impact and outputs a detection signal. Impact sensor 520 is not limited to this, and a well-known configuration is used.

Further, the vehicle-mounted camera 530 is, for example, a Charged-Coupled Devices (CCD), Metal-oxide-semiconductor (MOS) or a photographing device using an image sensor such as a Complementary Metal-Oxide-Semiconductor (CMOS), so that the front and rear conditions of the vehicle 500 can be detected by an image (still image or moving image). Incidentally, by the images detected by the vehicle-mounted camera 530 during the travel of the vehicle 500 being stored in storage unit 513, a so-called drive recorder can be configured.

Then, returning to FIG. 2, the first acquisition unit 3032 of controller 303 of the server 300 has, by acquiring the detection signal outputted by impact sensor 520 installed in the vehicle 500 via communication unit 301, the ability to obtain the presence or absence of an external impact to the vehicle 500. At this time, the first acquisition unit 3032, together with the detection signal outputted by impact sensor 520 installed in the vehicle 500, also acquires the posit information and identification information of the vehicle 500.

Identifying unit 3033 identifies a target vehicle, which is a vehicle to which an external impact is applied, from among the vehicles 500 parked in the parking lot 50. As described above, the first acquisition unit 3032 detects an impact on a vehicle of the vehicle 500, and acquires position information and identification information of the vehicle. Then, identifying unit 3033 can identify the target vehicle from the vehicle 500 by comparing the data thus acquired with the parking status of the parking lot 50 managed by management unit 3031.

Selection unit 3034 selects a surrounding vehicle, which is a vehicle parked around target vehicle in parking lot 50. Further, the first command unit 3035 is a functional unit for issuing a command for activating the vehicle-mounted camera 530 of the surrounding vehicle selected by selection unit 3034. This will be explained with reference to FIGS. 3 and 4.

Figure 3:
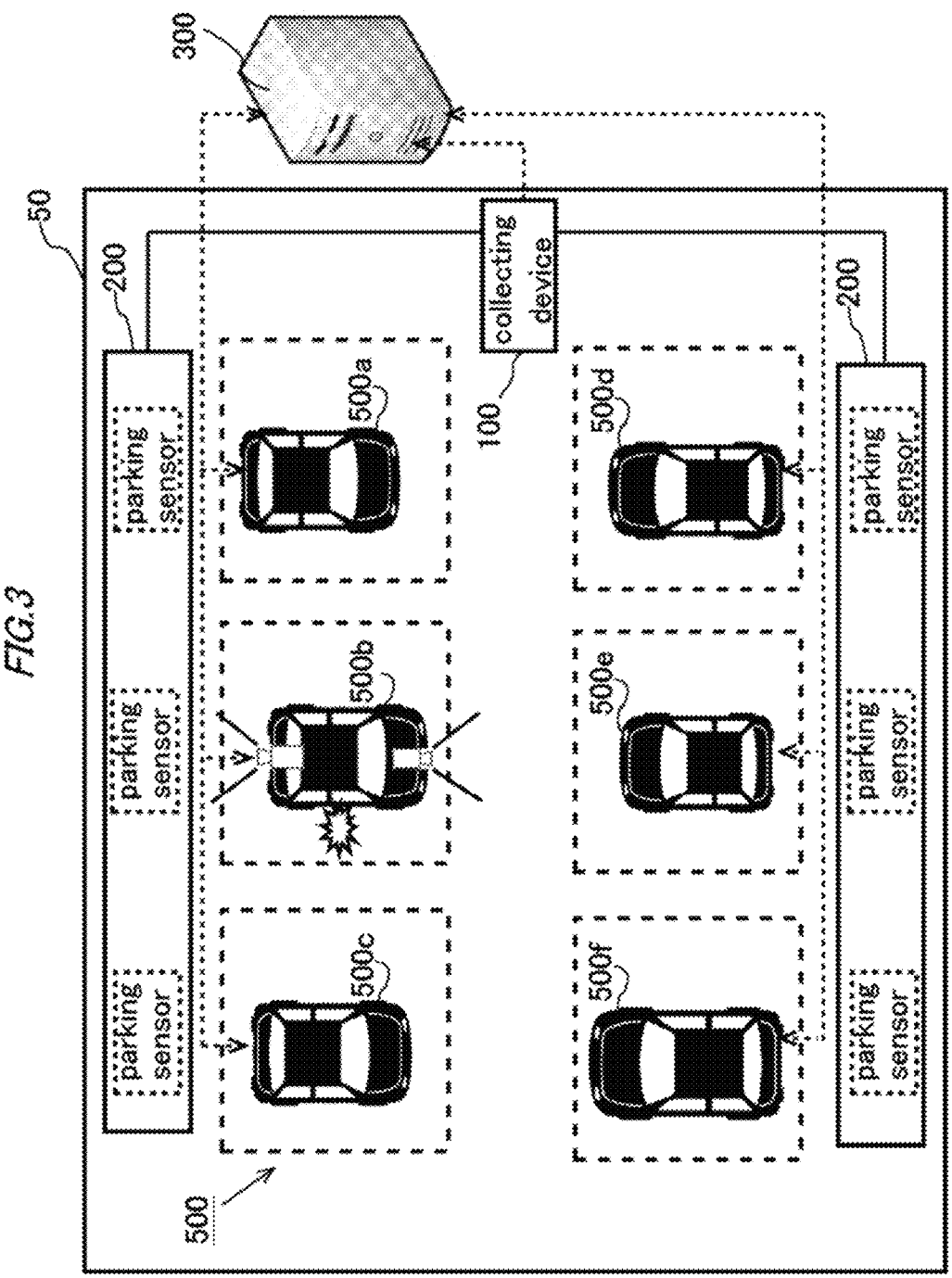
FIG. 3 is a first view for explaining the monitoring of the parking lot in the first embodiment.

FIG. 3 is, a first view for explaining the monitoring of the parking lot 50 in the first embodiment. In the parking lot 50 shown in FIG. 3, the parking lot installation type of monitoring camera is not provided. In this case, even if a shock is applied from the outside to the vehicle 500 parked in the parking lot 50, it is difficult to accurately grasp the situation.

Therefore, it is conceivable to monitor the parking lot 50 using the vehicle-mounted camera 530 provided in the vehicle 500. For example, someone gives an impact to the vehicle 500$b$ shown in FIG. 3, and the vehicle-mounted camera 530 of target vehicle 500$b$ impacted from the outside is activated. In this instance, the periphery of the vehicle 500$b$ is photographed in the field of view of target vehicle 500$b$ from the vehicle-mounted cameras 530. However, it is difficult to acquire image information photographed in a field of view including the vehicle 500$b$, and it is also difficult to accurately grasp a situation in which an impact is given by someone.

Figure 4:
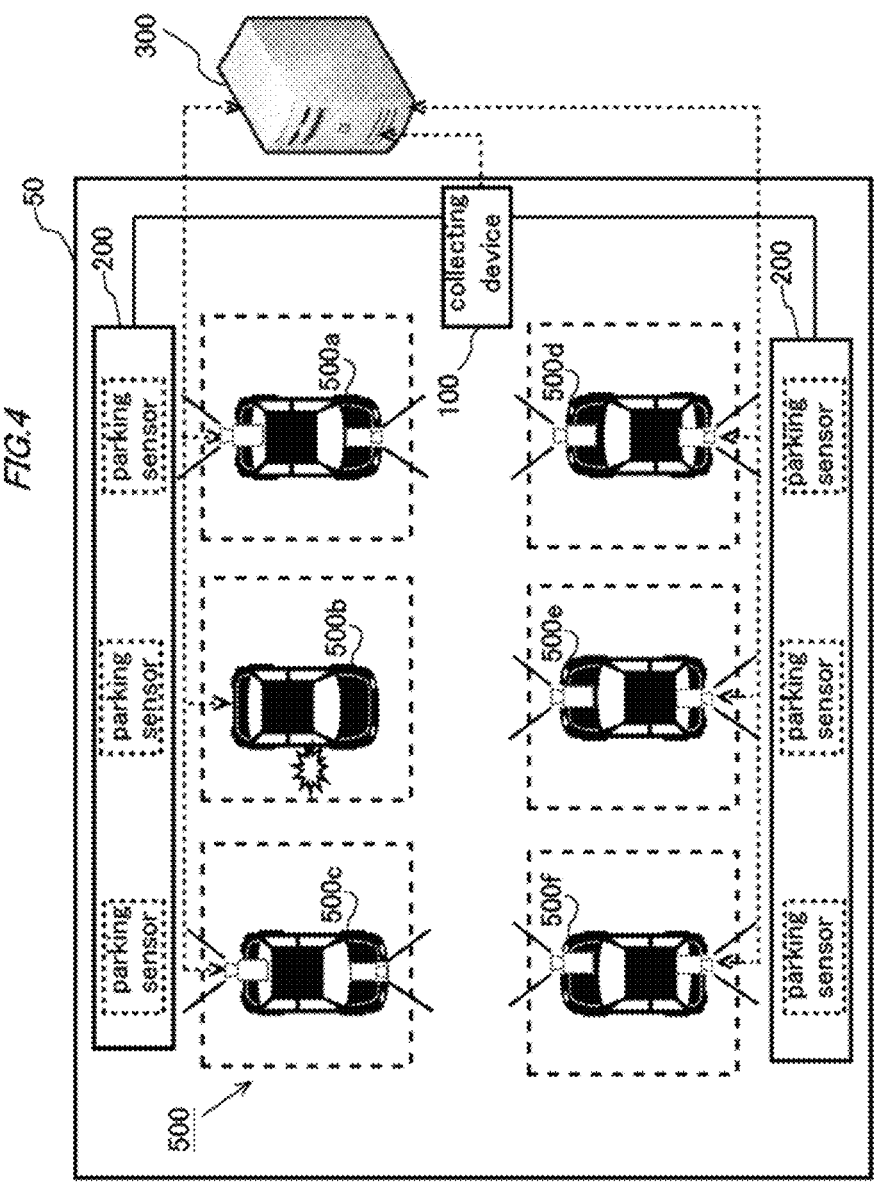
FIG. 4 is a second diagram for explaining the monitoring of the parking lot in the first embodiment.

Therefore, in the present embodiment, as shown in FIG. 4, the vehicle-mounted camera 530 of a surrounding vehicle parked around the target vehicle is activated. FIG. 4 is a second view for explaining the monitoring of the parking lot 50 in the first embodiment. In the present embodiment, the first acquisition unit 3032 included in controller 303 of the server 300 acquires an external impact on the vehicle 500 parked in the parking lot 50. Then, identifying unit 3033 identifies target vehicle 500$b$ to which, an external impact has been applied from the inside of the vehicle 500. Selection unit 3034 selects surrounding vehicle 500$a$, 500$c$, 500$d$, 500$e$, and 500$f$ parked around the vehicle 500$b$, instead of target vehicle 500$b$, as the vehicle for activating the vehicle-mounted cameras 530. That is, in the present embodiment, of the vehicles 500 parked in the parking lot 50, all the vehicles except target vehicle 500$b$ are selected as a surrounding vehicle. Selection unit 3034 can select a surrounding vehicle based on the parking status of the parking lot 50 managed by management unit 3031. Note that the vehicle-mounted cameras 530 of the vehicle 500$b$ may capture images regardless of the selection process of selection unit 3034.

Then, the first command unit 3035 issues a command to start the vehicle-mounted cameras 530 of surrounding vehicles 500$a$, 500$c$, 500$d$, 500$e$, and 500$f$ selected by selection unit 3034 in this manner. Then, the periphery of a surrounding vehicle will be captured by the vehicle-mounted camera 530, and the image information captured in the field of view including, target vehicle 500$b$ is easily acquired. That is, even if an impact is applied to the vehicle 500 parked in the parking lot 50 from the outside, the situation can be accurately grasped, and thus the parking lot 50 can be suitably monitored. Here, surrounding vehicle-mounted cameras 530 correspond to the first vehicle sensors according to the present disclosure, and surrounding vehicle cameras 500$a$, 500$c$, 500$d$, 500$e$, and 500$f$ correspond to the first vehicle sensors according to the present disclosure.

Controller 303 functions as a controller by executing the processes of management unit 3031, the first acquisition unit 3032, identifying unit 3033, selection unit 3034, and the first command unit 3035. The server 300 functions as an information processing apparatus according to the present embodiment.

Next, input/output unit 304 is an interface for inputting and outputting information. Input/output unit 304 includes, for example, a display device and a touch panel. Input/output unit 304 may include keyboards, near field communications, touch screens, etc.

Figure 5:
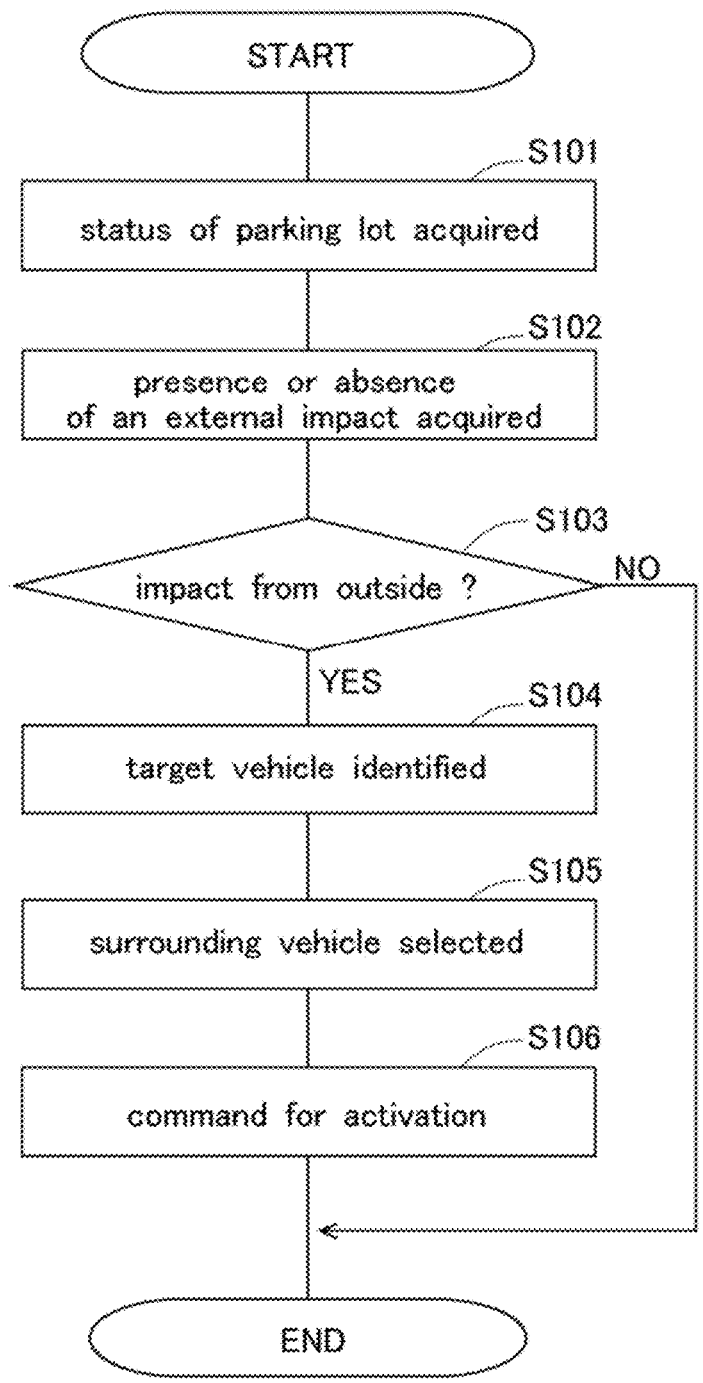
FIG. 5 is a flowchart for startup processing of the vehicle-mounted camera by the server in the first embodiment.

Here, the startup process of the vehicle-mounted camera 530 by the server 300 will be described with reference to the flowchart shown in FIG. 5. The activation process is executed by controller 303. First, in S101, the parking status of the parking lot 50 is acquired. Controller 303 acquires the parking status of the vehicle 500 in the parking lot 50 based on, for example, vehicle detection information transmitted from collecting device 100 and stored in storage unit 302, data relating to vehicle information transmitted from the vehicle 500 and stored in storage unit 302, and data for identifying the vehicle stored in other servers. When the process of S101 is completed, the process proceeds to S102.

In S102, the presence or absence of an external impact on the vehicle 500 is acquired. Controller 303 acquires the detection signal outputted by impact sensor 520 installed in the vehicle 500 via communication unit 301. Thus, controller 303 acquires the presence or absence of an external impact to the vehicle 500. Then, in S103, it is determined whether or not there has been an impact from the outside with respect to the vehicle 500. If an affirmative determination is made in S103, the process proceeds to S104, and if a negative determination is made in S103, the process is terminated.

If an affirmative determination is made in S103, then in S104, the vehicle 500 parked in the parking lot 50 is subjected to an external impact which identifies the target vehicle. Controller 303 identifies a target vehicle from the vehicle 500 based on the parking, status of the vehicle 500 in the parking lot 50 acquired in S101 process and the data acquired in S102 process (the data includes vehicle position information and identification information together with detection signals from impact sensor 520). When the process of S104 is completed, the process proceeds to S105.

S105 chooses a parked surrounding vehicle around the target vehicle identified in S104 process. Controller 303 selects a surrounding vehicle based on the parking status of the vehicle 500 in the parking lot 50 acquired in the S101 process. As described above, in the present embodiment, all of the vehicles 500 parked in the parking lot 50 except, for a target vehicle are selected as a surrounding vehicle.

Next, in S106, a command is issued for activating the vehicle-mounted camera 530 provided in a surrounding vehicle selected in the process of S105. That is, controller 303 based on the impact from the outside to the vehicle 500, issues a command for activating the vehicle-mounted camera 530 provided in a surrounding vehicle selected in the process of S105.

Thus, lased on the impact fro e outside to the vehicle 500, the vehicle-mounted camera 530 provided in surrounding vehicle is activated. As a result, it is possible to accurately gasp the condition in which the impact is applied to the target vehicle from the outside, and it is possible to preferably monitor the parking lot 50.

The parking lot 50 described above is a parking lot in which parking positions, which are spaces for parking the vehicle 500, are determined in advance, but the parking area according to the present invention is not limited thereto. For example, the parking area according to the present disclosure may be a riverbed in which there is space for parking the vehicle 500 but the position is not predetermined. Even in such cases, when a plurality of vehicles 500 in the riverbed is parked, the vehicle-mounted camera 530 provided in a surrounding vehicle based on the impact from the outside to the vehicle 500 is activated. Thus, it is possible to suitably monitor this parking area.

First Modification of the First Embodiment

Figure 6:
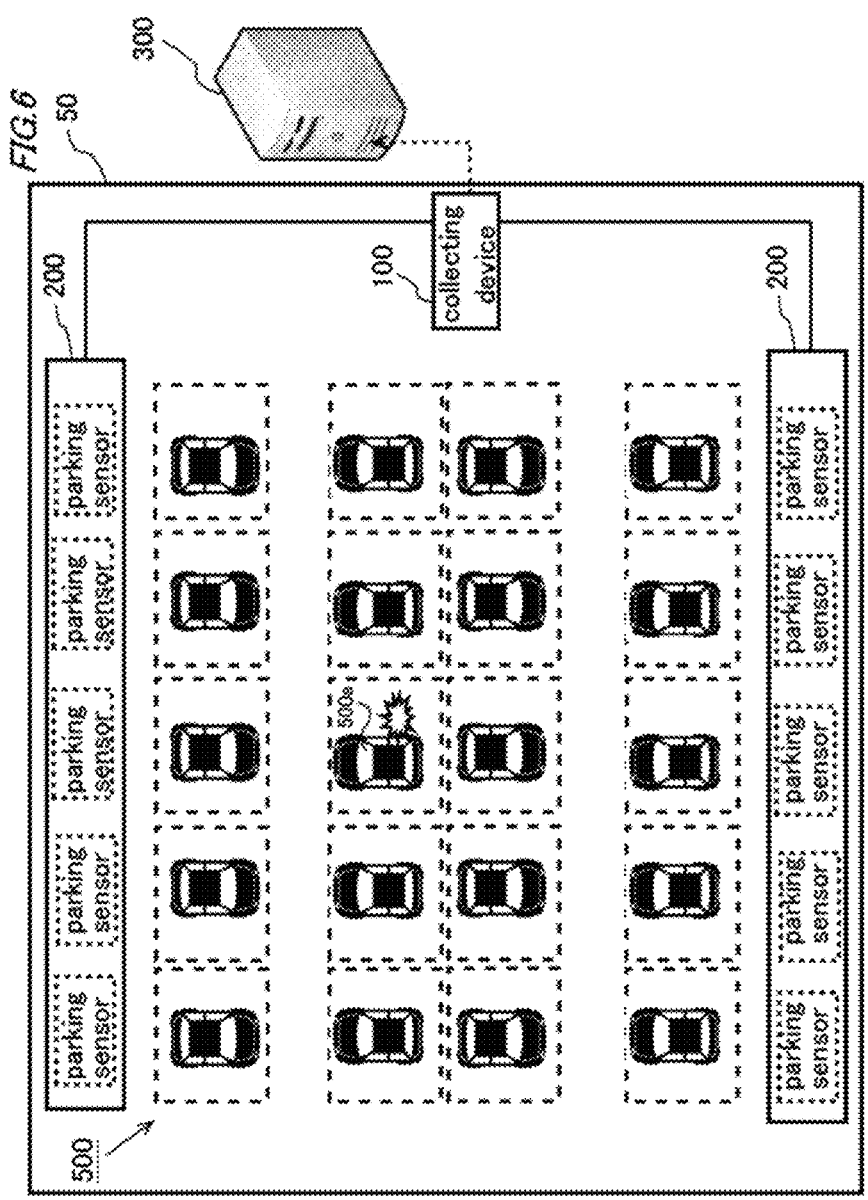
FIG. 6 shows that the parking lot in a first modification of the first embodiment is a diagram showing a schematic configuration of an information processing system.

A first modification of the first embodiment will be described with reference to FIGS. 6 and 7. FIG. 6 is a diagram showing a parking lot 50 according to the present modification together with a schematic configuration of an information processing system. Information processing system according to the present modification includes collecting device 100, parking sensor 200, and the servers 300, similarly to the first embodiment described above.

In the first embodiment, described above, the case where the number of vehicles 500 parked in the parking lot 50 is relatively small has been described as an example. In contrast, this modification gill be described with reference to a case where the number of vehicles 500 parked in the parking lot 50 is relatively large.

As shown in FIG. 6, in this modification, a relatively large number of vehicles 500 in the parking lot 50 is parked. In such a situation, it is assumed that an impact is applied from the outside to the vehicle 500a shown in FIG. 6. According to the first embodiment described above, of the vehicles 500 parked in the parking lot 50, all other vehicles except the vehicle 500a are selected as a surrounding vehicle. As a result, a large number of surrounding vehicle-mounted cameras 530 parked around the vehicle 500a are activated, and it becomes easier for the parking lot 50 to acquire images taken over a wide range. On the other hand, the processing load of the server 300 may increase.

Therefore, in this modification, selection unit 3034 having controller 303 of the server 300, of the vehicle 500 parked in the parking lot 50, the vehicle parked in a predetermined area including target vehicle impact from the outside is given as a surrounding vehicle. This will be explained with reference to FIG. 7.

Figure 7:
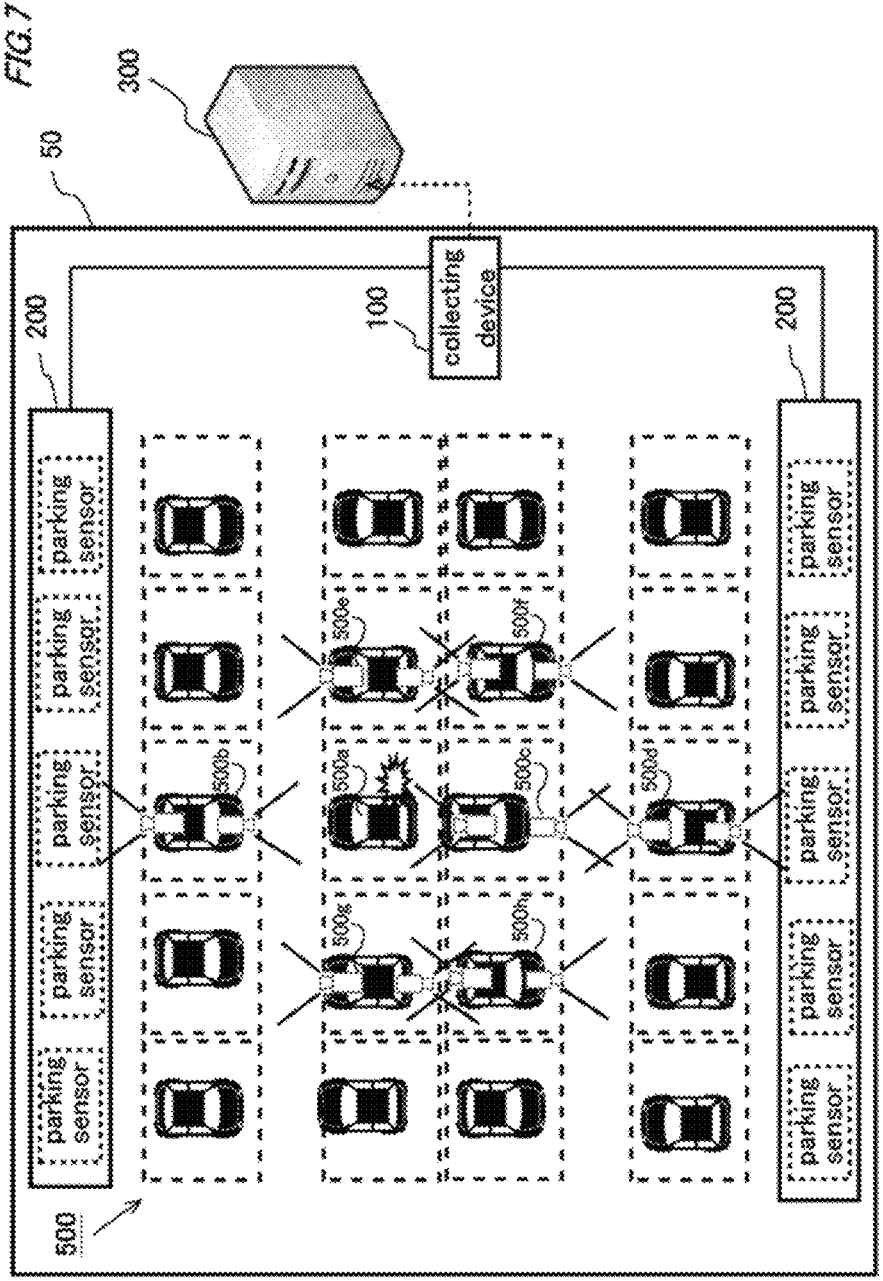
FIG. 7 is a diagram for explaining a monitoring of the parking lot in the first modification of the first embodiment.

FIG. 7 is a diagram for explaining the monitoring of the parking lot 50 in the present modification. In the present modification, the first acquisition unit 3032 acquires that there is an external impact on the vehicle 500 parked in the parking lot 50, and identifying unit 3033 identifies target vehicle 500a to which the external impact is applied from the inside of the vehicle 500. As shown in FIG. 7, selection unit 3034 selects a vehicle 500b to 500h parked in a predetermined area including target vehicle 500a from among the vehicles 500 parked in the parking lot 50 as a surrounding vehicle. Here, the predetermined ranges in the present modification are: a parking position adjacent to the side of target vehicle 500a (the vehicle 500e and the vehicle 500g are parked in the parking position); a parking position adjacent to the rear of target vehicle 500a (the vehicle 500c is parked in the parking position); a parking position adjacent to the obliquely rear of target vehicle 500a (the vehicle 500f and the vehicle 500h are parked in the parking position); and a parking position facing target vehicle 500 a (the vehicle 500b is parked in the parking position). Further, the predetermined range in the present modification includes a parking position facing longitudinal direction, which is the traveling direction of target vehicle 500a, with respect to the parking position adjoining the rear of target vehicle 500a, in which the vehicle 500d is parked. Selection unit 3034 can select surrounding vehicle 500b to 500h parked in the parking position based on the parking status of the parking lot 50 managed by management unit 3031.

Then, when the vehicle-mounted camera 530 provided in surrounding vehicle thus selected is activated, it is possible to accurately grasp the situation where an impact is given from the outside to target vehicle, while the processing load of the server 300 is reduced.

Second Modification of the First Embodiment

A second modification of the first embodiment will be described with reference to FIGS. 8 and 9. The parking lot 50 in the present modification is a parking lot in which a relatively large number of vehicles 500 are parked, similarly to the first modification of the first embodiment. Then, in information processing system according to this modification, parking sensor 200 is configured to include an installation-type camera.

Here, the installation type camera included in parking sensor 200, for example, is a Charged-Coupled Devices (CCD), Metal-oxide-semiconductor (MOS) or a photographing device using an image sensor such as a Complementary Metal-Oxide-Semiconductor (CMOS), and the state of the parking lot 50 can be detected by an image (still image or moving image).

Then, in this modification, based on the image information captured by the installation type camera provided in the parking lot 50, a surrounding vehicle is selected. This will be explained with reference to FIG. 8.

Figure 8:
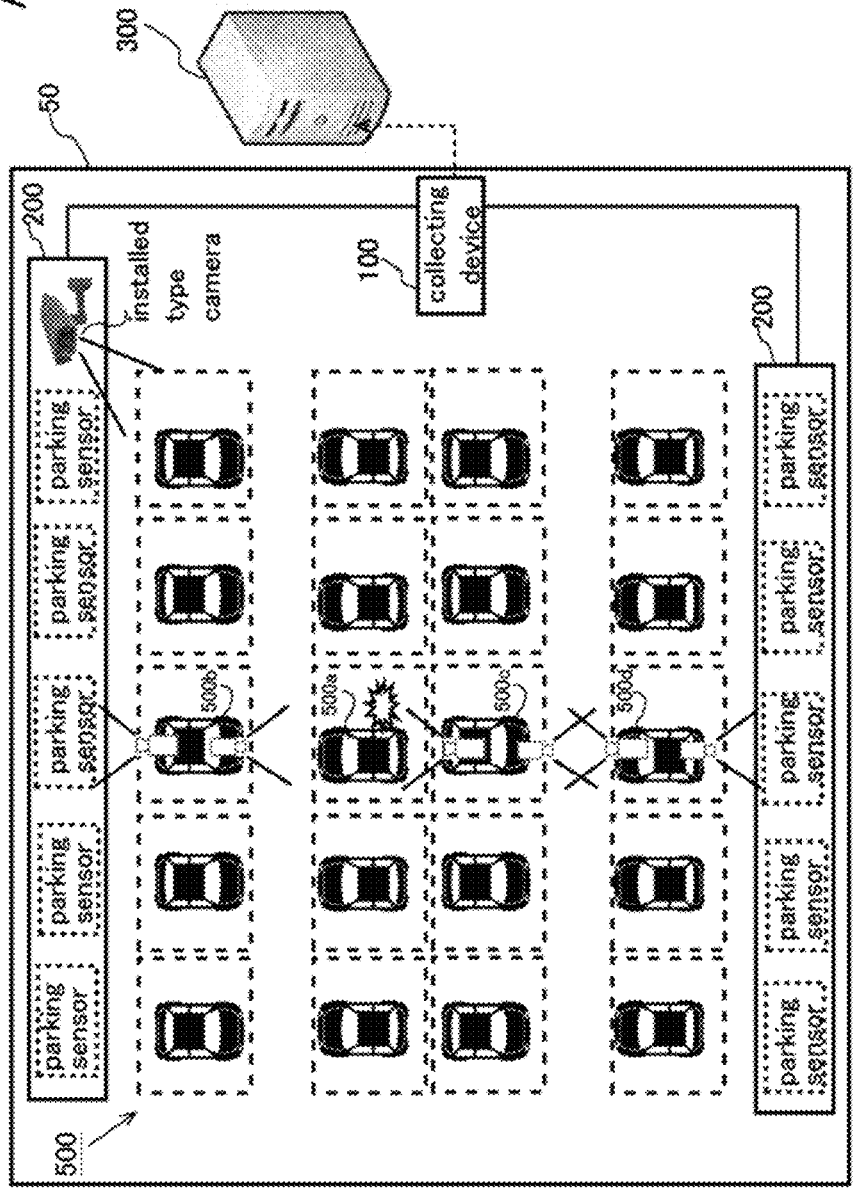
FIG. 8 is a first diagram for explaining the monitoring of the parking lot in a second modification of the first embodiment.

FIG. 8 is a first diagram for explaining the monitoring of the parking lot 50 in the present modification. In the present modification, similarly to the first modification of the first embodiment, selection unit 3034 included in controller 303 of the server 300 selects, as a surrounding vehicle, a vehicle parked in a predetermined area including target vehicle 500a among the vehicles 500 parked in the parking lot 50. At this time, unit 3034 selects a surrounding vehicle, based on the parking status of the parking lot 50 managed by management unit 3031, and the image information captured by the installation type camera provided in the parking lot 50. Then, for example, as shown in FIG. 8, a vehicle 500b to a vehicle 500d parked alongside the vehicle 500a in the vertical direction which is the traveling direction of target vehicle 500a is selected as a surrounding vehicle by selection unit 3034. Image information captured by the installed cameras is collected by collecting device 100 and transmitted to the server 300. Then, selection unit 3034 acquires the image information captured by the installation-type camera via communication unit 301. Further, in this case, the installation type camera provided in the parking lot 50 corresponds to the installation type sensor according to the present disclosure.

Here, as described above, the vehicle-mounted camera 530 can detect the situation in front of and behind the vehicle 500 by an image, i.e., a still image or a moving image. Then, when the vehicle-mounted camera 530 provided in surrounding vehicle selected as described above is activated, the vehicle-mounted cameras 530 of surrounding vehicle 500b to 500d parked vertically alongside the vehicle 500a can easily acquire the image information photographed in the field of view including target vehicle 500a. In other words, selection unit 3034 selects, as a surrounding vehicle, a vehicle parked by the vehicle-mounted camera 530 at a position where the vehicle can be photographed in the field of view including target vehicle 500a, based on the image information photographed by the installation type camera provided in the parking lot 50. As a result, it is possible to accurately grasp a situation in which an impact is applied to target vehicle from the outside.

Incidentally, the above has been described as an example of using the vehicle-mounted camera 530 as a sensor capable of detecting peripheral information of the vehicle 500 (first vehicle sensor according to the present disclosure). The type of the sensor can vary, as long as it can sense peripheral information of the vehicle 500. For example, a sensor configured to detect the presence of a person may be used as a sensor capable of detecting peripheral information of the vehicle 500. Incidentally, the sensor may be an infrared sensor, or may be an ultrasonic sensor. This will be explained with reference to FIG. 9.

Figure 9:
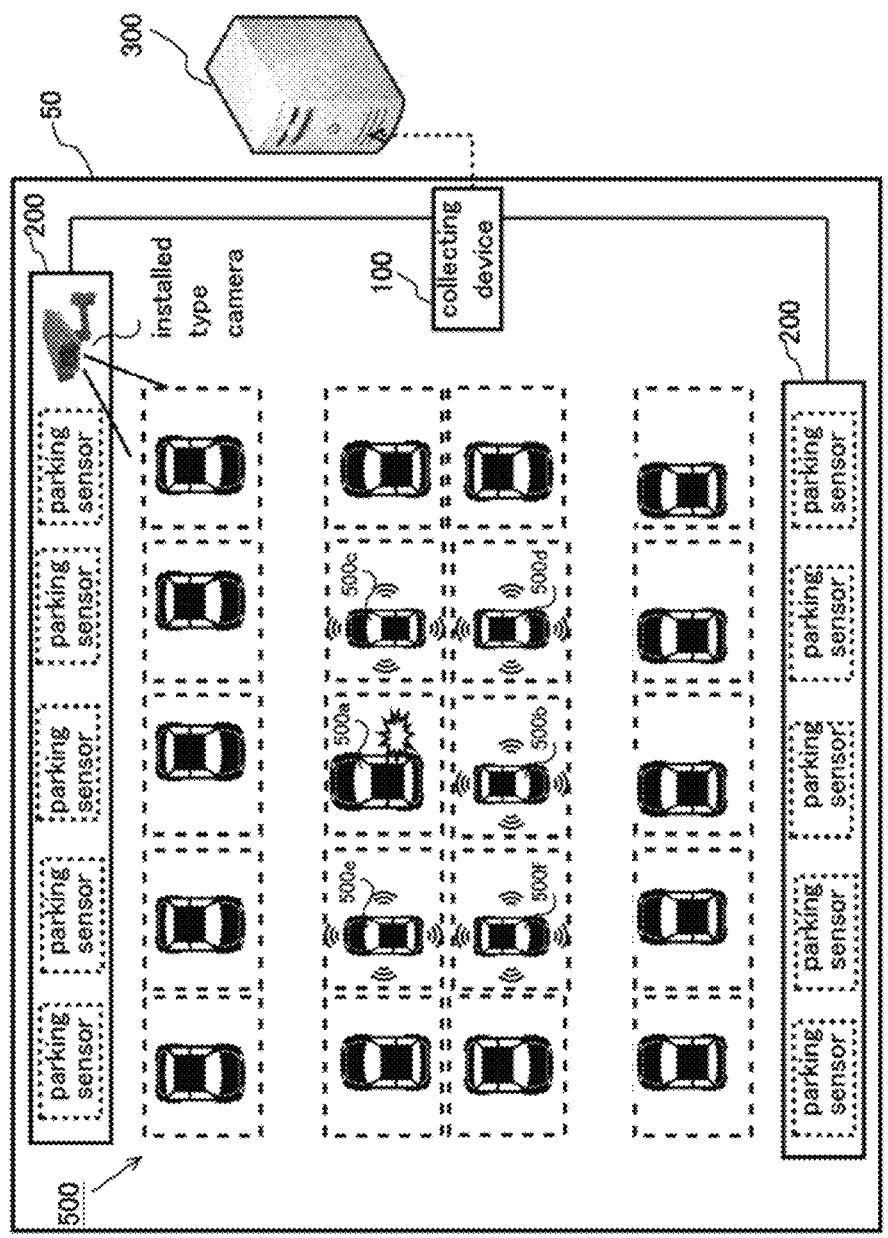
FIG. 9 is a second diagram for explaining the monitoring of the parking lot in the second modification of the first embodiment.

FIG. 9 is a second diagram for explaining the monitoring of the parking lot 50 in the present modification. In the embodiment shown in FIG. 9, selection unit 3034 selects the vehicles 500b to 500f parked next to the periphery of target vehicle 500a as a surrounding vehicle based on the parking status of the parking lot 50 managed by management unit 3031, and the first command unit 3035 issues a command to activate the sensor of the surrounding vehicle that is capable of detecting humans. As a result, such a human sensor of the vehicle parked next to the periphery of target vehicle 500a is activated. In this case, the server 300 acquires a signal detected by the human sensor from the vehicle 500 to infer the current position of the person who has given the impact to the vehicle 500a. Then, the server 300, with respect to the installation type camera provided in the parking lot 50, issues a command to take the estimated current position. As a result, it is possible to acquire image information of a person who has given an impact to the vehicle 500a. Here, the installation type camera provided in the parking lot 50, by a command from the outside, the shooting range is configured to be variable. Commands from the server 300 to the installed cameras are transmitted via collecting device 100 configured to be able to communicate with the server 300. As described above, it is possible to accurately grasp the status in which an impact is applied to a target vehicle from the outside.

Third Modification of the First Embodiment

Figure 10:
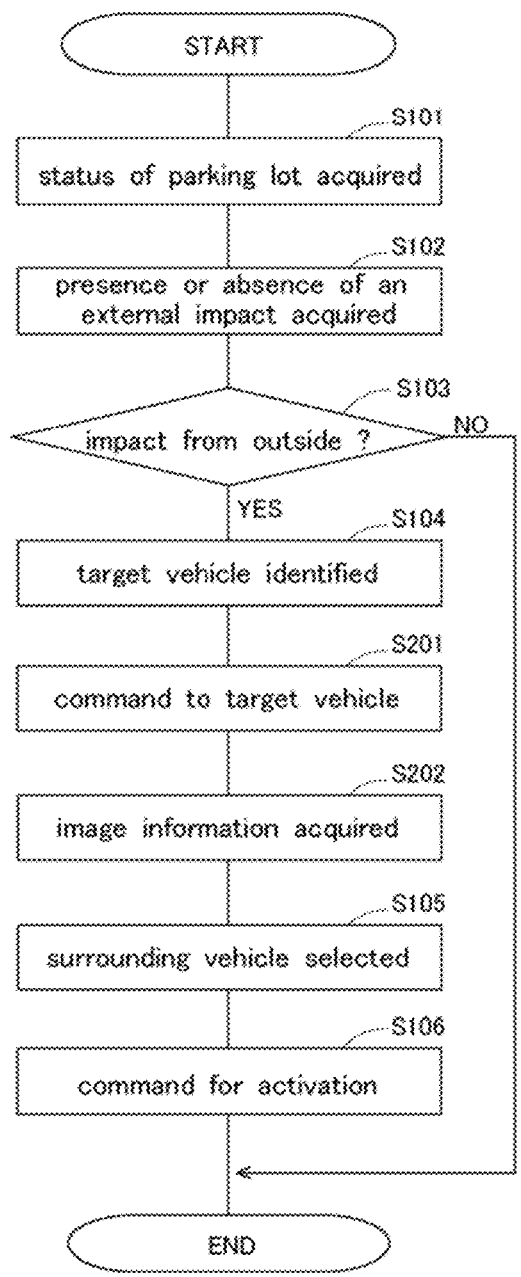
FIG. 10 is a flowchart for the startup process of the vehicle-mounted camera by the server in a third modification of the first embodiment.

A third modification of the first embodiment will be described with reference to FIGS. 10 to 13. FIG. 10 is a flowchart for the startup process of the vehicle-mounted camera 530 by the server 300 in this modification. The activation process is executed by controller 303, in each of the processes shown in FIG. 10, substantially the same processes as those shown in FIG. 5 are denoted by the same reference numerals, and a detailed description thereof is omitted. The parking lot 50 in the present modification is also a parking lot in which a relatively large number of vehicles 500 are parked similarly to the first modification of the first embodiment.

Figure 11:
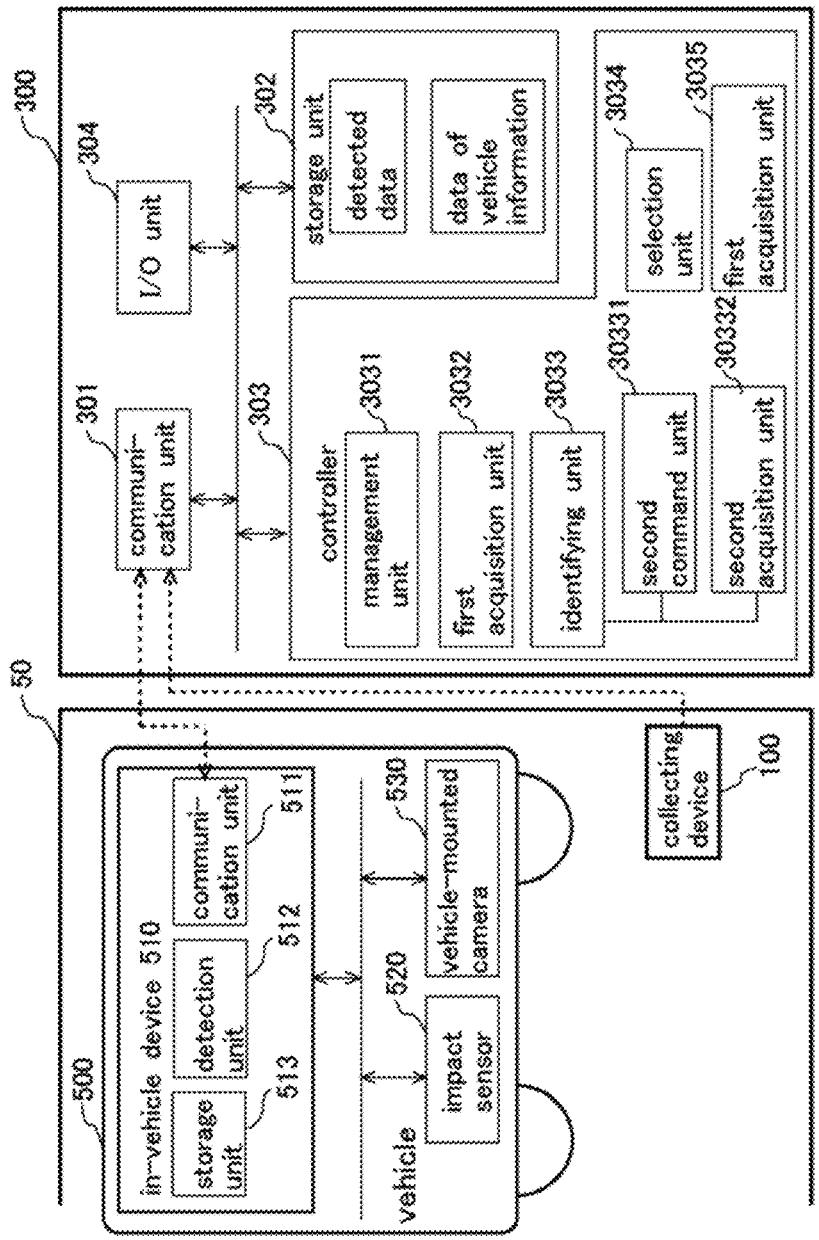
FIG. 11 is a diagram shown in the components of an information processing system in the third modification of the first embodiment in more detail.

In this modification, when the process of S104 is completed, next, in S201, a command is issued for activating the vehicle-mounted camera 530 is provided in a target vehicle identified by the process of S104. Then, when the process of S201 is completed, the process proceeds to S202. In S202, the image information captured by the vehicle-mounted camera 530 of target vehicle is acquired. Here, according to FIG. 11 showing the components of the server 300 in the present modification in more detail, identifying unit 3033 included in controller 303 of the server 300 has the second command unit 30331 and the second acquisition unit 30332 as functional units. In the S201 process, the second command unit 30331 issues a command for activating the vehicle-mounted camera 530 provided in the target vehicle. Further, in the process of S202, the second acquisition unit 30332 acquires the image information captured by the vehicle-mounted camera 530 of the target vehicle. Here, the second acquisition unit 30332 can acquire the image information transmitted from the target vehicle via communication unit 301. When the process of S202 is completed, the process proceeds S105.

Figure 12:
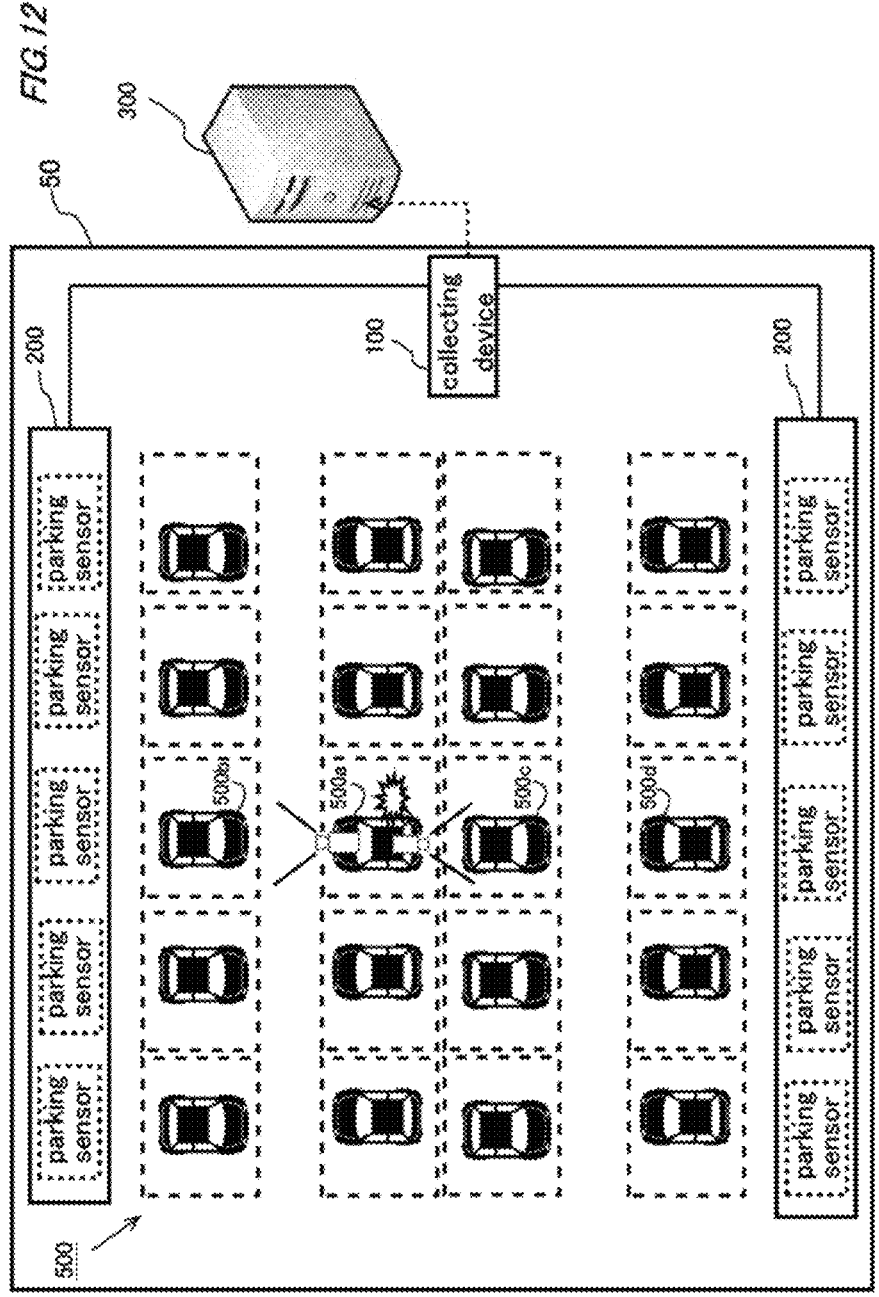
FIG. 12 is a first diagram for explaining the monitoring of the parking lot in third modification of the first embodiment.

Here, the above processing will be described with reference to FIG. 12. FIG. 12 is a first diagram for explaining the monitoring of the parking lot 50 in the present modification. In the present modification, the vehicle 500a shown in FIG. 12 is specified as the vehicle target vehicle by S104 process. As a result of S201 process, an instruction for starting the vehicle-mounted cameras 530 provided in target vehicle 500a is issued. Then, the periphery of target vehicle 500a is photographed in the vertical direction (the traveling direction of target vehicle 500a) by the vehicle-mounted cameras 530. Then, controller 303 of the server 300 acquires the captured image information (S202 process). The image information includes the vehicle 500b to the vehicle 500d parked along with target vehicle 500a in the vertical direction. In this instance, the vehicle-mounted cameras 530 of target vehicle 500a correspond to a target vehicle sensor.

Figure 13:
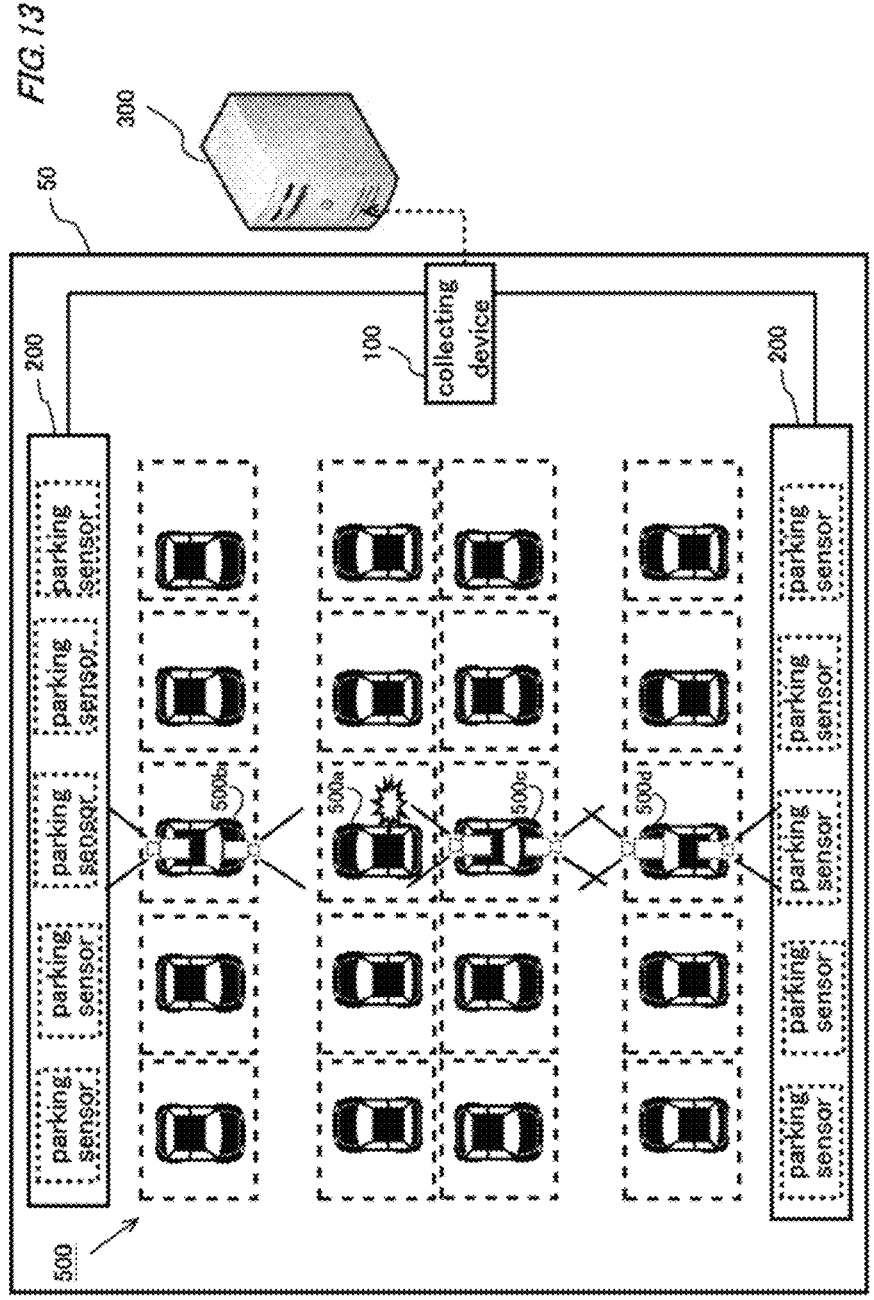
FIG. 13 is a second diagram for explaining the monitoring of the parking lot in the third modification of the first embodiment.

In S105, controller 303 selects a surrounding vehicle based on the image information captured by the vehicle-mounted camera 530 of target vehicle 500a acquired in the S202 process. Then, in S106, a command is issued for activating the vehicle-mounted camera 530 provided in the surrounding vehicle selected in the process of S105. This will be explained with reference to FIG. 13. FIG. 13 is a second diagram for explaining the monitoring of the parking lot 50 in the present modification. According to FIG. 13, a vehicle 500b-500d parked in a direction alongside a target vehicle 500a is selected as a surrounding vehicle. As a result, the vehicle-mounted cameras 530 of surrounding vehicle 500b to the vehicle 500d can easily acquire the image information captured in the field of view including target vehicle 500a. As a result, it is possible to accurately grasp a situation in which an impact is applied to a target vehicle from the outside.

Fourth Modification of the First Embodiment

Figure 14:
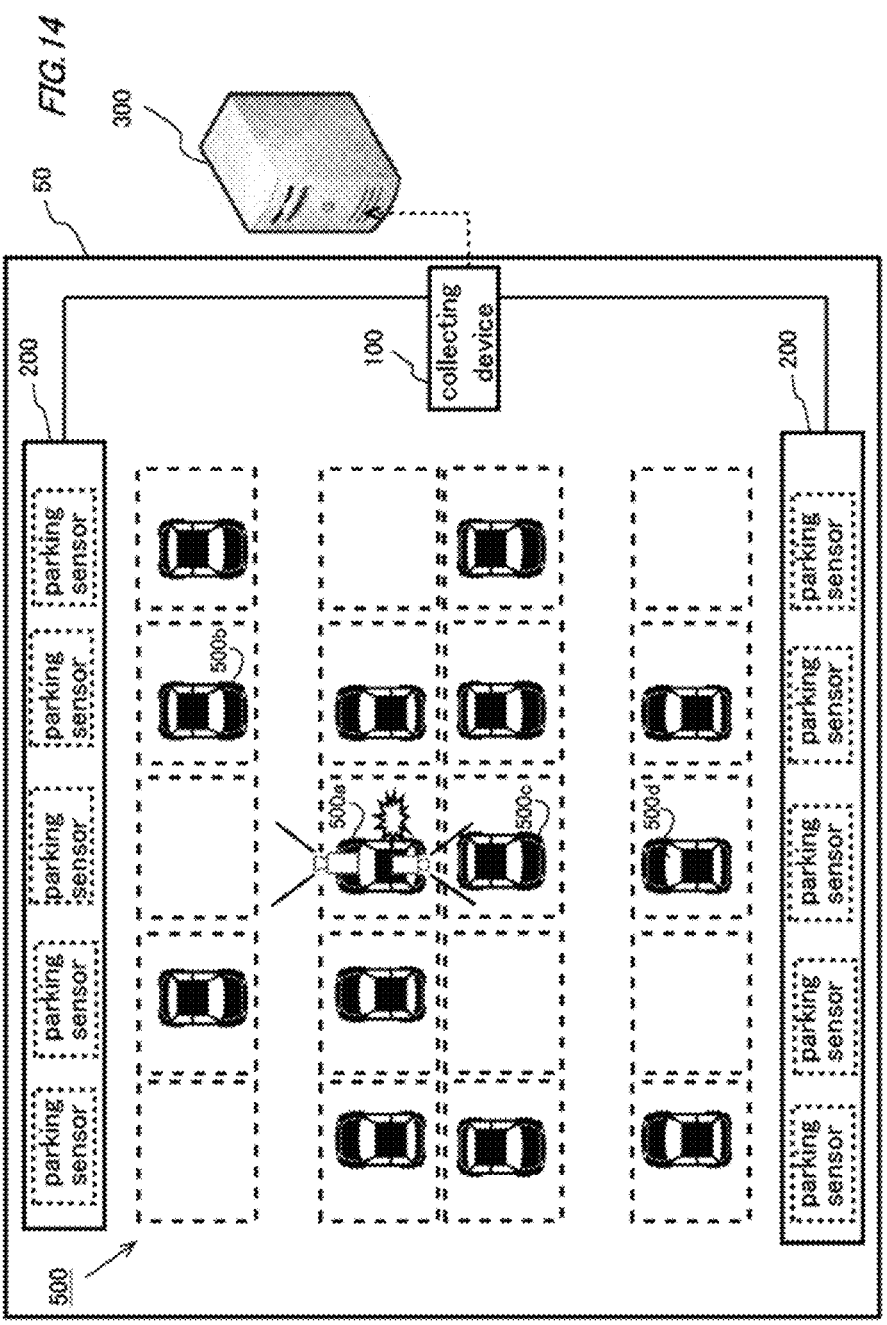
FIG. 14 is a first diagram for explaining the monitoring of the parking lot in the fourth modification of the first embodiment.
Figure 15:
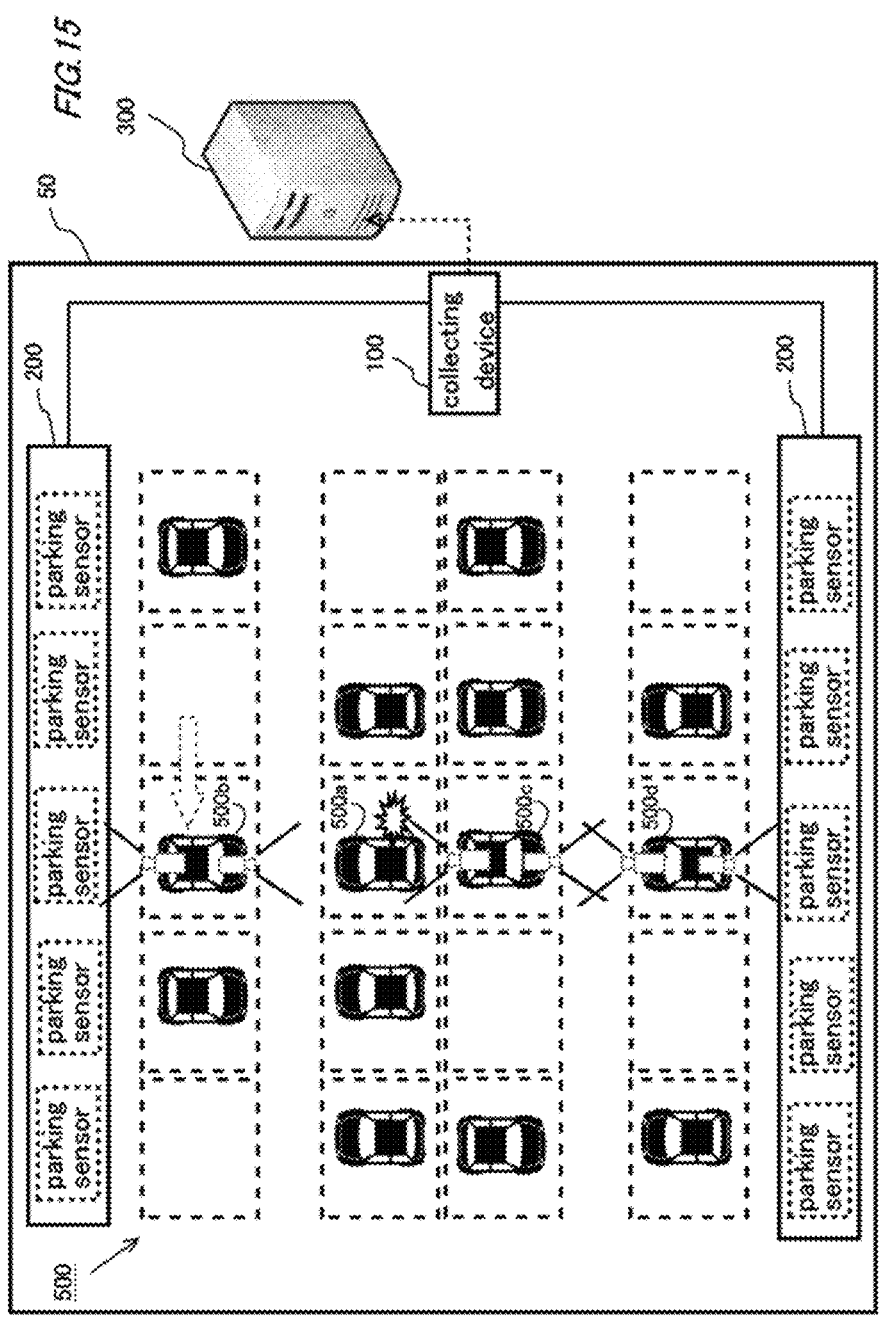
FIG. 15 is a second diagram for explaining the monitoring of the parking lot in the fourth modification of the first embodiment.

A fourth modification of the first embodiment will be described with reference to FIGS. 14 and 15. Server 300 in this modification executes the star up process of the vehicle-mounted camera 530 in the same procedure as in the third modification of the first embodiment. That is, even in this modification, when the process of S104 shown in FIG. 10 above is completed, next, in S201, a command is issued for activating the vehicle-mounted camera 530 provided in target vehicle specified by the process of S104. In S202, the image information captured by the vehicle-mounted camera 530 of target vehicle is acquired. Then, in S105, a surrounding vehicle is selected based on the image information captured by the vehicle-mounted camera 530 of target vehicle acquired in the process of S202. In S106, a command is issued for activating the vehicle-mounted camera 530 provided in surrounding vehicle selected in the process of S105.

Here, the above processing will be described with reference to FIG. 14. FIG. 14 is a first diagram for explaining the monitoring of the parking lot 50 in the present modification. According to FIG. 14, unlike FIG. 12, the vehicle is not parked on the opposite side of target vehicle 500a, in this case, even if the vehicle-mounted cameras 530 provided in surrounding vehicle (vehicles 500b to 500d shown in FIG. 14) are activated, it may be difficult to accurately acquire the image information captured m the field of view including a target vehicle 500a.

Therefore, in this modification, controller 303 of the server 300, in the process of S106 shown in FIG. 10 above, issues a command for activating, the vehicle-mounted camera 530, and issues a command for moving the predetermined surrounding vehicle. This will be explained with reference FIG. 15. FIG. 15 is a second diagram for explaining the monitoring of the parking lot 50 in the present modification. According to FIG. 15, of surrounding, vehicle 500b to the vehicle 500d, the vehicle 500b is moved by a command from the server 300. More specifically, controller 303 of the server 300 issues a moving command to the vehicle 500b to position the vehicle 500b on the opposite side of target vehicle 500. Here, the vehicle 500 parked in the parking lot 50 is an autonomous traveling vehicle configured to be autonomously driven, and thus, it is possible to autonomously run based on a command from the outside. As a result, the vehicle-mounted cameras 530 of surrounding vehicle 500b to the vehicle 500d can easily acquire the image information captured in the field of view including target vehicle 500a, thereby enabling the user to accurately grasp the situation in which an impact is applied to a target vehicle from the outside.

Fifth Modification of the First Embodiment

Figure 16:
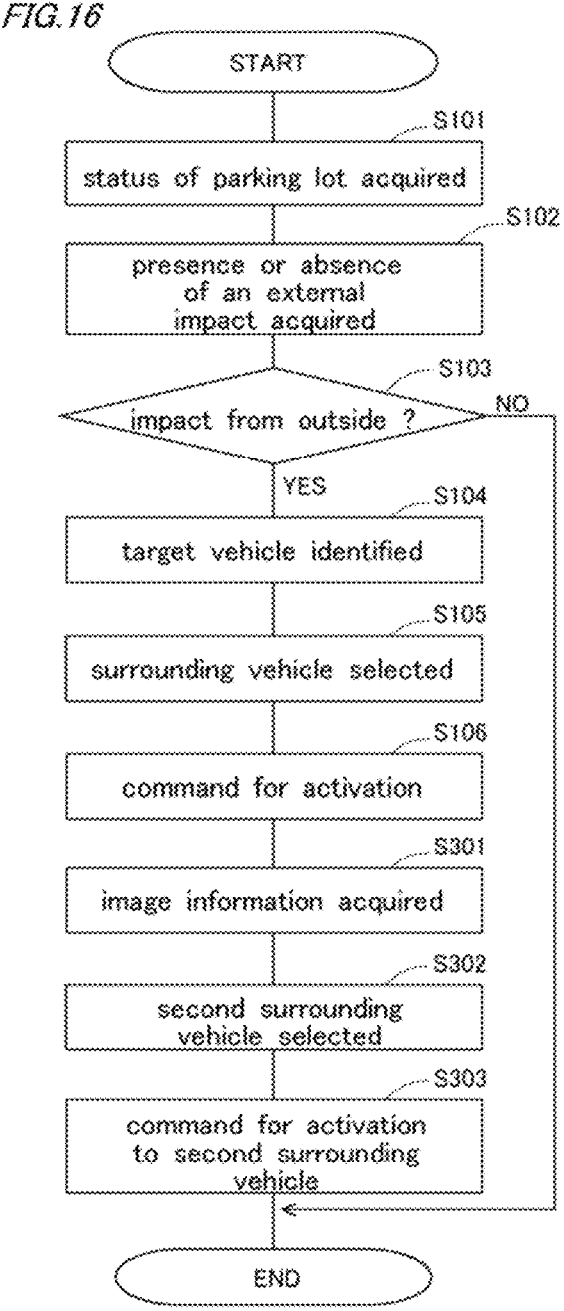
FIG. 16 is a flowchart for the startup process of the vehicle-mounted camera by the server in a fifth modification of the first embodiment.
Figure 17:
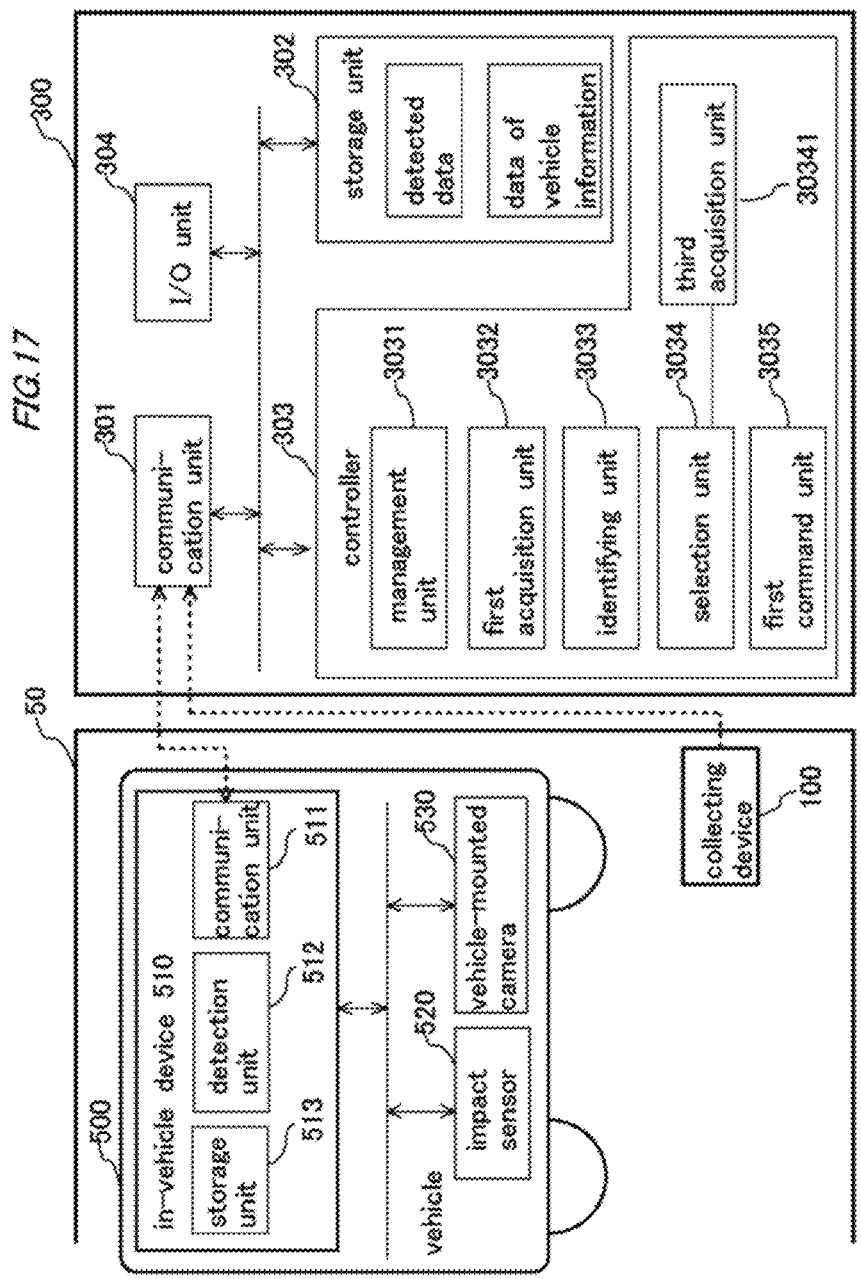
FIG. 17 is a diagram showing the components of an information processing system in the fifth modification of the first embodiment in more detail.
Figure 18:
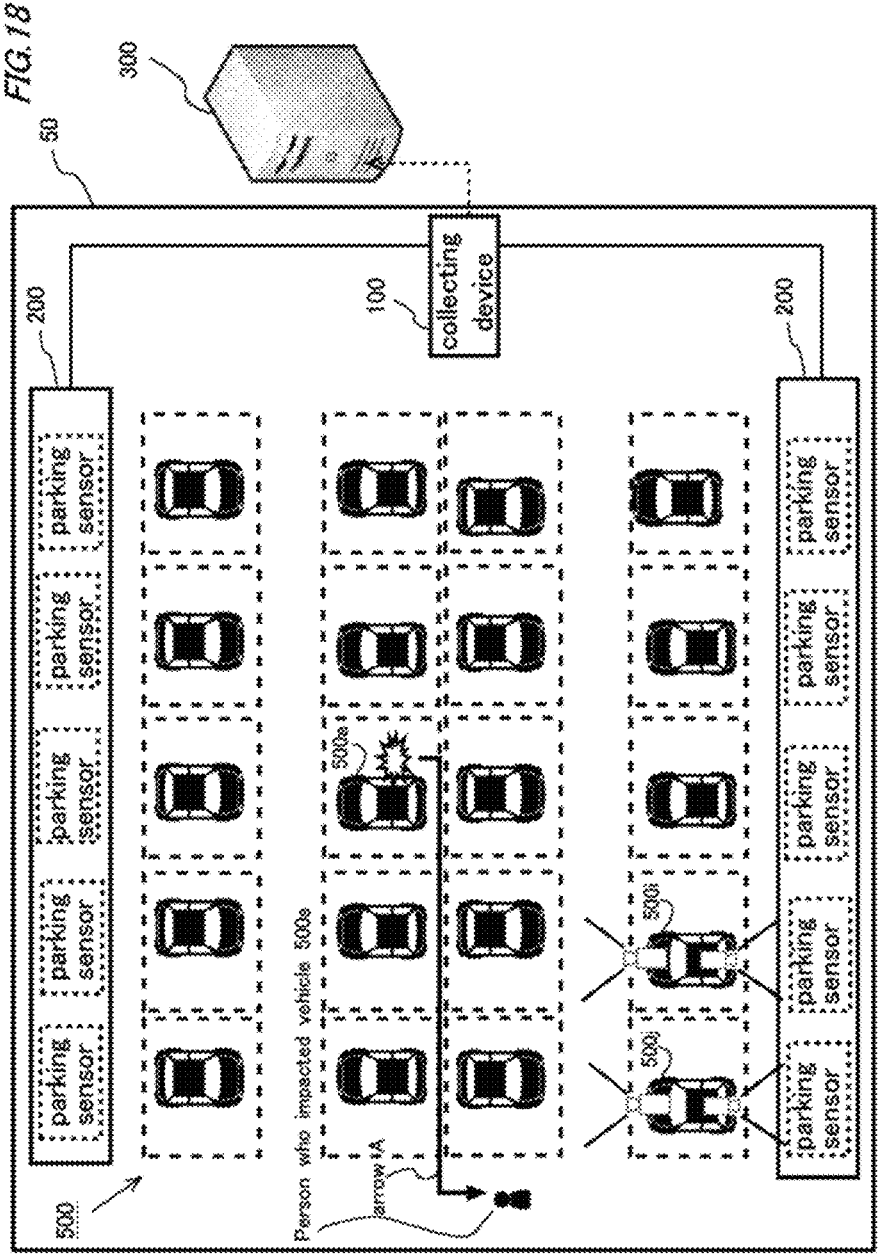
FIG. 18 is a diagram for explaining a monitoring of the parking lot in the fifth modification of the first embodiment.

A fifth modification of the first embodiment will be described with reference to FIGS. 16 to 18. FIG. 16 is a flowchart for the startup process of the vehicle-mounted camera 530 by the server 300 in this modification. The activation process is executed by controller 303, in each of the processes shown in FIG. 16, substantially the same processes as those shown in FIG. 5 are denoted by the same reference numerals, and a detailed description thereof is omitted. The parking lot 50 in the present modification is also a parking lot in which a relatively large number of vehicles 500 are parked similarly to the first modification of the first embodiment.

In this modification, when the process of S106 is completed, then, in S301, the image information captured by the vehicle-mounted camera 530 of a surrounding vehicle activated in the process of S106 is acquired. Here, according to FIG. 17 showing the components of the server 300 in the present modification in more selection unit 3034 included in controller 303 of the server 300 has the third acquisition unit 30341 as a functional unit. In the S301 process, the third acquisition unit 30341 acquires the image information captured by the vehicle-mounted camera 530 of the surrounding, vehicle. Here, the third acquisition unit 30341 can acquire the image information transmitted from the surrounding vehicle via communication unit 301. In the following explanation, the surrounding vehicle selected in S105 process is referred to as a first surrounding vehicle.

Next, S302 selects a second surrounding vehicle, based on the image information captured by the vehicle-mounted camera 530 of the first surrounding vehicle obtained by the process of S301. Here, the second surrounding vehicle is a vehicle that differs from both the target vehicle and the first surrounding vehicle, and is parked around the first surrounding vehicle among the vehicles 500 parked in the parking lot 50. Then, when the process of S302 is completed, next, in S303, a command is issued for activating the vehicle-mounted camera 530 provided in the second surrounding vehicle selected in the process of S302. This will be explained based on FIG. 7 and FIG. 18.

In this modification, controller 303 of the server 300, in the process of S106, issues a command for activating the vehicle-mounted camera 530 provided in the first surrounding vehicle. This is exemplified by FIG. 7 described above, and according to FIG. 7, among the vehicles 500 parked in the parking lot 50, the vehicle-mounted cameras 530 provided in the first surrounding vehicle 500b to 500h parked in a predetermined area including target vehicle 500a are activated. Then, it is possible to acquire image information photographed in the field of view including target vehicle 500a, and it is possible to acquire image information of a person who has given an impact to the vehicle 500a. Here, it is assumed that a person who has given an impact to the vehicle 500a moves within the parking lot 50 thereafter. In this instance, when the person who has given the impact to the vehicle 500a, moves, the person may deviate from the shooting range of the vehicle-mounted cameras 530 provided in the first surrounding vehicle 500b to 500h.

Therefore, in the present modification, controller 303 of the server 300 selects the second surrounding vehicle based on the image information captured by the vehicle-mounted cameras 530 of the first surrounding vehicle 500b to 500h in S302 process. Here, FIG. 18 is a diagram for explaining the monitoring of the parking lot 50 in the present modification. According to FIG. 18, a person who has given an impact to target vehicle 500a moves along a path indicated by an arrow A. In this instance, controller 303 selects the vehicle 500i and the vehicle 500j as the second surrounding vehicle so that a travel route of the person impacting the vehicle 500a can be recognized using the image information captured by the vehicle-mounted cameras 530 of the first surrounding vehicle 500b to 500h and the movement of the person can be monitored thereafter. In the S303 process, controller 303 issues a command to start the vehicle-mounted cameras 530 provided in the second surrounding vehicle 500i and 500j. As a result, even if a person who has given an impact to the vehicle 500a moves in the parking lot 50, it is possible to acquire image information of the person. Here, the second surrounding vehicle 500i and 500j correspond to the second vehicle. The vehicle-mounted cameras 530 of the second surrounding vehicle correspond to the second vehicle sensors.

Second Embodiment

Figure 19:
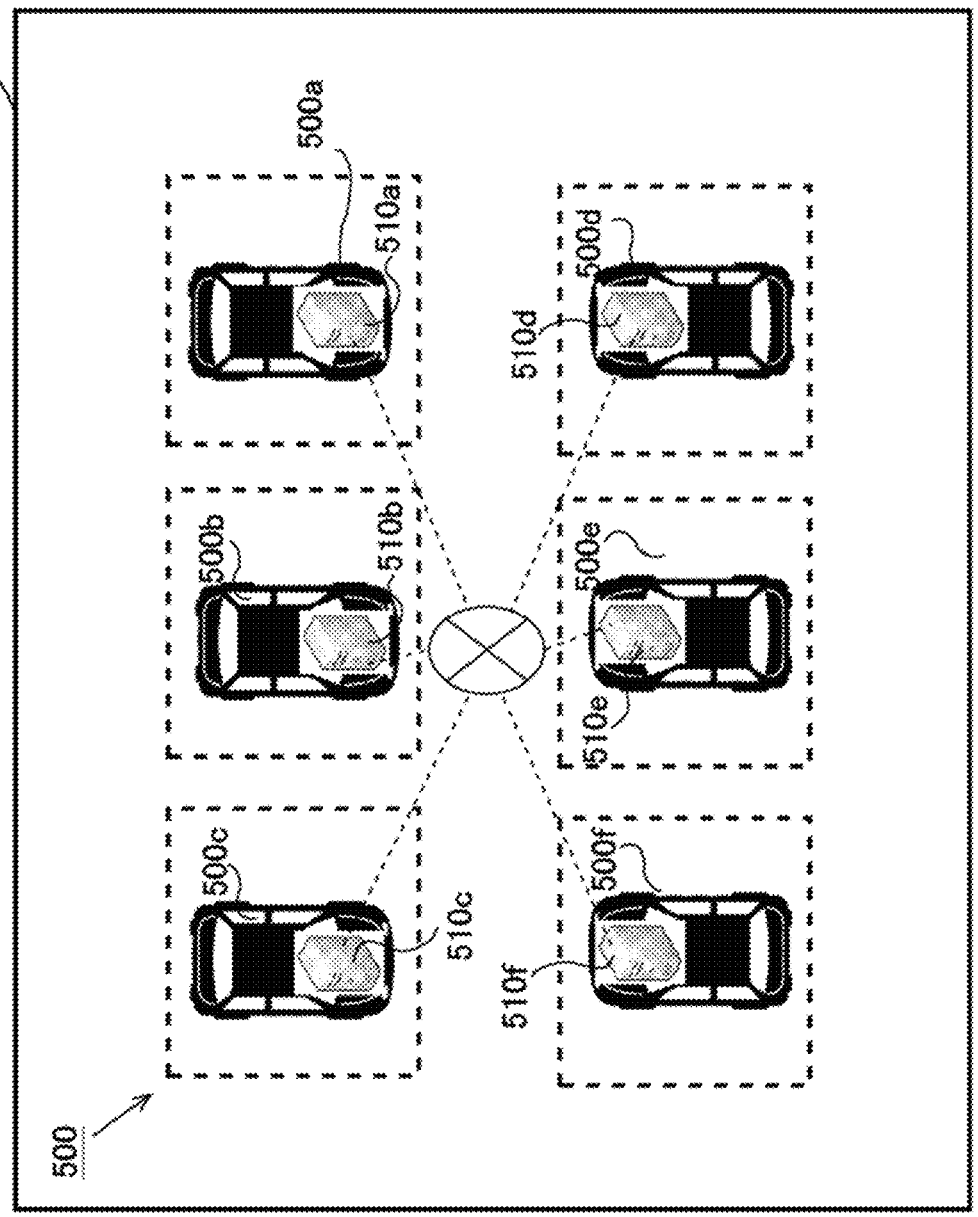
FIG. 19 is a diagram showing a schematic configuration of an information processing system in the second embodiment.
Figure 20:
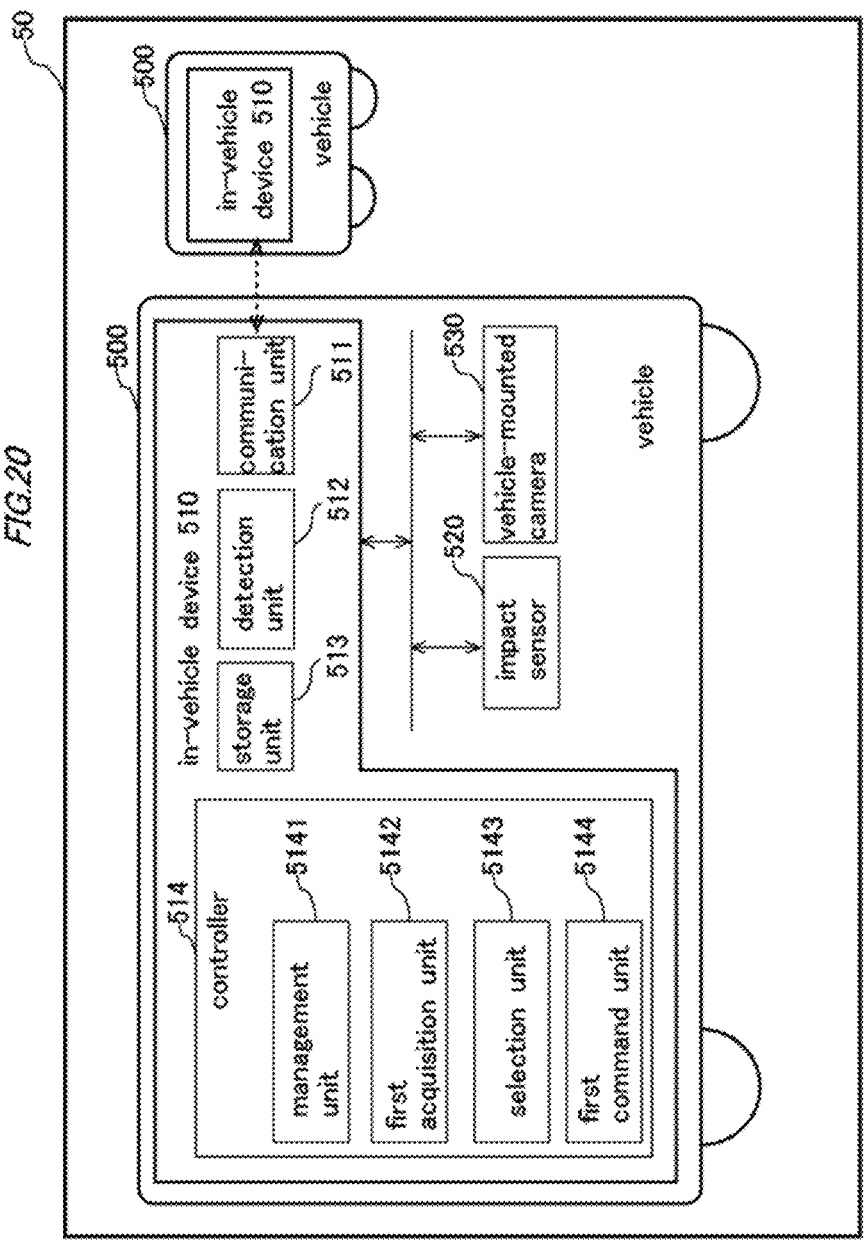
FIG. 20 is a diagram showing the components of information processing system in the second embodiment in more detail.

The second embodiment will be described with reference to FIGS. 19 to 22. FIG. 19 is a diagram showing a parking tot 50 according to the present embodiment together with a schematic configuration of an information processing system. FIG. 20 is a diagram illustrating in more detail the components of the in-vehicle device 510 of the vehicle 500 included in information processing system. In the present embodiment, as shown in FIG. 19, a vehicle 500a to a vehicle 500f are parked in the parking lot 50 as a vehicle 500, and the vehicles 500a to 500f have an on-vehicle device 510a to an on-vehicle device 510f.

In the present embodiment, the vehicles 500 parked in the parking lot 50 are configured to be able to communicate with each other, so that data can be exchanged between the vehicles, and a predetermined command can be transmitted from one vehicle to the other.

The vehicle-mounted device 510 of the vehicle 500 includes a controller 514 in addition to the above-described communication unit 511, detection unit 512, and storage unit 513 as functional units. Here, controller 514 performs as a functional unit for controlling the in-vehicle device 510. Controller 514 can be realized by a processor such as a central processing unit (CPU). Controller 514 further comprises a management unit 5141, a first acquisition unit 5142, a selection unit 5143, and four functional portion of the first command unit 5144. Each functional unit may be realized by executing a stored program by the CPU. The program executed in controller 514 and the data used by the control program are stored in the auxiliary storage device of storage unit 513. The main memory device of storage unit 513 functions as a memory in which a program executed by controller 514 and data used by the control program are expanded.

Management unit 5141 based on the data transmitted from the other vehicle 500 parked in the parking lot 50, manages the parking status of the vehicle in the parking lot 50. Here, the data transmitted from the other vehicle 500 includes position information, identification information, and the like of the vehicle. The in-vehicle device 510 is connected to other servers via networks, and is configured to be accessible to databases for identify vehicles. Therefore, management unit 5141 can identify the vehicle by checking the identification information of the other vehicle 500 parked in the parking lot 50 with the vehicle information stored in the other servers. Management unit 5141 can manage the parking position of another vehicle 500 parked in the parking lot 50.

The first acquisition unit 5142 acquires the presence or absence of an external impact on its own vehicles. As described above, the vehicle 500 includes impact sensor 520. Therefore, the first acquisition unit 5142 acquires the presence or absence of an external impact to its own vehicle by acquiring the detection outputted by impact sensor 520 installed in its own vehicle.

Selection unit 5143 selects a surrounding which is a vehicle parked around its own vehicle (target vehicle) that has been externally impacted at the parking lot 50. Further, the first command unit 5144 is a functional unit issuing a command activating the vehicle-mounted camera 530 of the surrounding vehicle selected by selection unit 5143.

In this embodiment, as shown in FIG. 21, the vehicle-mounted cameras 530 of surrounding vehicle 500a, 500c, 500d, 500e, and 500f parked around target vehicle 510b are activated. FIG. 21 is a diagram for explaining the monitoring of the parking lot 50 in the second embodiment. In the present embodiment, the first acquisition unit 5142 included in controller 514 of target vehicle 510b acquires the fact that here has been an external impact on its own vehicle 510b. Then, selection unit 5143 selects surrounding vehicle 500a, 500c, 500d, 500e, and 500f parked around target vehicle 500b as the vehicle for activating the vehicle-mounted cameras 530. Selection unit 5143 can select a surrounding vehicle based on the parking status of the parking lot 50 managed by management unit 5141.

Then, the first command unit 5144 issues a command to start the vehicle-mounted cameras 530 of surrounding vehicle 500a, 500c, 500d 500e, and 500f selected by selection unit 5143 in this manner. Then, the periphery of surrounding vehicle will be captured by the vehicle-mounted camera 530, the image information captured in the field of view including target vehicle 500b is easily acquired. Here, surrounding vehicle 500a, 500c, 500d, 500e, and 500f correspond to the first vehicle. These vehicle-mounted camera 530 of surrounding vehicle corresponds to the first vehicle sensor according to present disclosure.

Controller 514 functions as a controller by executing processes of management unit 5141, the first acquisition unit 5142, selection unit 5143, and the first command unit 5144. The vehicle-mounted device 510 functions as an information processing apparatus according to the present embodiment.

Here, the startup process of the vehicle-mounted camera 530 by the on-board device 510 will be described with reference to a flowchart shown in FIG. 22. The activation process is executed by controller 514. First, in S401, the parking status of the parking lot 50 is acquired. Controller 514 acquires the parking status of the vehicle 500 in the parking lot 50 based on the data transmitted from the other vehicle 500 parked in the parking lot 50. When the process of S401 is completed, the process proceeds to S402.

In S402, the presence or absence of an external impact on the vehicle 500 is acquired. Controller 514 acquires the presence or absence of an external impact to its own vehicle by acquiring the detection signal outputted by impact sensor 520 installed in its own vehicle 500. Then, in S403, it is determined whether or not there has been an impact from the outside with respect to the vehicle itself. If an affirmative determination is made in S403, the process proceeds to S404, and if a negative determination is made in S403, the process is terminated.

If S403 is affirmative, then S404 selects a surrounding vehicle parked around its target vehicle to which an external shock has been applied. Controller 514 selects a surrounding vehicle based on the parking status of the vehicle 500 in the parking lot 50 acquired in the S401 process.

Next, in S405, a command is issued for activating the vehicle-mourned camera 530 provided in the surrounding vehicle selected in the process of S404. That is, controller 514 based on the impact from the outside to its own vehicle, issues a command for activating the vehicle-mounted camera 530 provided in surrounding vehicle selected in the process of S404.

As described above, when the vehicle-mounted cameras 530 provided in the surrounding, vehicle are activated on the basis of an external shock to the vehicle 500, the situation in which an external shock is applied to the vehicle can be accurately grasped, whereby the parking lot 50 can be suitably monitored.

Third Embodiment

A third embodiment will be described with reference to FIGS. 23 to 26. FIG. 23 is a diagram showing a parking lot 50 according to the present embodiment together with a schematic configuration of an information processing system. In addition to the configuration shown in the first embodiment, information processing system according to the present embodiment includes mobile terminal 20 of the user 10 of the vehicle 500.

In the first embodiment, the vehicle-mounted cameras 530 provided in a surrounding vehicle are activated based on external shocks to the vehicle 500, which are predetermined inputs from the outside to the vehicle 500. On the other hand, in the present embodiment, the vehicle-mounted cameras 530 provided in the surrounding vehicles are activated based on predetermined requests from the user 10 of the vehicle 500, which are predetermined inputs from the outside to the vehicle 500. This will be described below together.

As shown in FIG. 23, a relatively large number of vehicles 500 are parked in the parking lot 50. As a result, it may be difficult for the user 10 of the vehicle 500 to find his or her own vehicle from among many vehicles 500. In such a case, if the user 10 can be suitably guided to his/her own vehicle by monitoring the parking lot 50, the convenience of the user can be enhanced and the security of the parking lot 50 can be enhanced. Therefore, in the present embodiment, based on the guide request from the user 10 of the vehicle 500, together with the vehicle-mounted camera 530 provided in a surrounding vehicle being activated, the guidance to the user 10 using surrounding vehicle is executed.

FIG. 24 is a flowchart illustrating a process of guidance to the user 10 by the server 300 according to the present embodiment. The guidance process is executed by controller 303 of the server 300. First, in S501, the parking status of the parking lot 50 is acquired. The process of S501 is substantially identical to the treatment of S101 shown in FIG. 5 above. When the process of S501 is completed, the process proceeds to S502.

In S502, the presence or absence of guidance requests from the user 10 of the vehicle 500 is acquired. Then, in S503, it is determined whether or not a guidance is requested from the user 10. If an affirmative determination is made in S503, the process proceeds to S504, and if a negative determination is made in S503, the process is terminated.

Here, the server 300 is communicatively coupled via a communication unit 301 to mobile terminal 20 of the user 10. The user 10 requests guidance to his/her own vehicles by using mobile terminal 20. Controller 303 acquires the guidance request transmitted from mobile terminal 20 via communication unit 301, thereby acquiring the presence or absence of the guidance request from the user 10. Mobile terminal 20 has a communication unit 21 air input/output unit 22, and position detection unit 23 as functional units. Communication unit 21 is a communication interface for connecting mobile terminal 20 to a network, and includes, for example, a network interface board and wireless communication circuits for wireless communication. Input/output unit 22 is a functional unit for displaying information or the like transmitted from the outside via communication unit 21 and inputting the information when transmitting the information to the outside via communication unit 21, and is configured to have, for example, a display device or a touch panel. Position detection unit 23 is a functional unit for detecting the position of mobile terminal 20, for example, is formed with a GPS device.

If an affirmative determination is made in S503, then in S504, the vehicle 500 parked in the parking lot 50 is identified for a target vehicle for which guidance has been requested by the user 10. Controller 303 identifies a tartlet vehicle from the vehicle 500 based on the parking status of the vehicle 500 in the parking lot 50 acquired in the S101 process and the data acquired in the S502 process (the data includes the position information and the identifying information of the user 10). Here, the server 300 is connected to another server via a network, and is configured to be accessible to a database for linking the user information and the vehicle information. Therefore, controller 303 can use the data stored in the data base to identify a target vehicle. When the process of S504 is completed, the process proceeds to S505.

The process of S505 chooses a parked surrounding vehicle around the target vehicle identified in the S504 process. The process of S505 is substantially identical to the process of S105 shown in FIG. 5 above. Next, in S506, a command is issued for activating the vehicle-mounted camera 530 provided in surrounding vehicle selected in the process of S505. That is, controller 303 based on the guide request from the user 10 of the vehicle 500, issues a command for activating the vehicle-mounted camera 530 provided in surrounding vehicle selected in the process of S505. As a result, for example, as shown in FIG. 25, the vehicle-mounted cameras 530 of surrounding vehicle 500$b$ to the vehicle 500$h$ parked in a predetermined area including target vehicle 500$a$ are activated. FIG. 25 is a first diagram for explaining the monitoring of the parking lot 50 in the present embodiment. When the process of S506 is completed, the process proceeds to S507.

In S507, the image information captured by the vehicle-mounted camera 530 of surrounding vehicle activated in the process of S506 is acquired. Controller 303 can acquire the image information transmitted from surrounding vehicle via communication unit 301.

Next, in S508, based on the image information captured by the vehicle-mounted camera 530 of surrounding vehicle acquired in the process of S507, to select guide vehicle. Here, a guide vehicle is a vehicle parked at a position where the user 10 can be guided to the guidance route to a target vehicle among the vehicles 500 parked in the parking lot 50. When the processing of S508 is completed, a command for starting guidance means provided in guide vehicle selected in S508 processing is issued in S509. This will be explained with reference to FIG. 26.

FIG. 26 is a second diagram for explaining the monitoring of the parking lot 50 in the present embodiment. Here, in FIG. 26, a guidance route to target vehicle 500a for the user 10 is indicated by an arrow B. Controller 303 acquires the guidance route based on the images captured by the vehicle-mounted cameras 530 of surrounding vehicle 500b to 500h shown in FIG. 25. Then, in the present embodiment, the vehicles 500i. 500j, 500f and 500k facing the guide route are selected as the guide vehicle. The vehicle 500b facing target vehicle 500a is selected as the guide vehicle. Here, guide vehicle 500b, 500i, 500j, 500f, and 500k correspond to the third vehicle.

In the present embodiment, the vehicle 500 includes a headlight 540 as a guidance means. Then, the above processing starts the headlights 540b, 540i, 540j, 540f, and 540k of the vehicles 500b, 500i, 500j, 500f, and 500k.

Thus, based on the guide request from the user 10 of the vehicle 500, when the vehicle-mounted camera 530 provided in the surrounding vehicle is activated, based on the image information captured by the vehicle-mounted camera 530, i.e., based on the image information monitored parking lot 50, it is possible to obtain a guide path. By guiding the user 10 to his/her own vehicle using a guide vehicle selected on the basis of the guidance route, the convenience of the user is enhanced.

In addition, since the user 10 is guided to his/her own vehicle based on the image information obtained by monitoring the parking lot 50 described above, the security of the parking lot 50 is enhanced as much as possible. When acquiring the guidance route for the user 10, controller 303 of the server 300 can determine the guidance route that the user is less likely to touch another vehicle 500 on the way to the vehicle by using the monitoring images of the parking lot 50 taken in the field of view including the vehicle of the user 10. As a rest it, a situation in which the user 10 unintentionally applies an impact to the vehicle 500 of another person from the outside is suppressed as much as possible. In other words, the security of the parking lot 50 is increased as much as possible. As the security of the parking lot 50 is enhanced in this manner, the parking lot 50 can be suitably monitored.

<Other Variations>

The above embodiment is merely an example, and the scope disclosure may be appropriately modified and practiced without departing from the gist thereof. For example, the processing and means described in the present disclosure can be freely combined and implemented so long as technical inconsistencies do not occur.

Furthermore, a process that is described to be performed by one apparatus may be shared and performed by a plurality of apparatuses. For example, management unit 3031 and the first acquisition unit 3032 may be formed in a processing unit different from the server 300. At this time, the other arithmetic processing unit is preferably configured to cooperate with the server 300. Further, the processing described as being performed by different apparatuses may be executed by one device. Which function is to be implemented by which hardware configuration (server configuration) in a computer system may be flexibly changed.

The present disclosure may also be implemented by supplying computer programs for implementing the functions described in the embodiments described above to a computer, and by one or more processors of the computer reading out and executing the programs. Such computer program may be provided to the computer by a non-transitory computer-readable storage medium that can be connected to a system bus of the computer, or may be provided to the computer through a network. The non-transitory computer-readable storage medium nay be any type of disk including magnetic disks (floppy (registered trademark) disks, hard disk drives (HDDs), etc.) and optical disks (CD-ROMs, DVD discs, Blu-ray discs, etc.), read-only memories (ROMs), random access memories (RAMs), EPROMs, EEPROMs, magnetic cards, flash memories, optical cards, and any type of medium suitable for storing electronic instructions.

What is claimed is:

1. An information processing apparatus comprising:
a controller including a processor programmed to:
acquire a presence or an absence of a predetermined request from a user of a target vehicle parked in a predetermined parking area in which a plurality of vehicles are parked,
based upon a determination that the predetermined request from the user of the target vehicle has been acquired, identify the target vehicle for which the predetermined request is present among the plurality of parked vehicles,
based upon the identification of the target vehicle, select a first vehicle that is parked around the target vehicle in the predetermined parking area,
issue a command to activate a first vehicle sensor of the first vehicle that was selected, wherein the first vehicle sensor is configured to detect a peripheral information of the first vehicle.

2. The information processing apparatus of claim 1, wherein
the first vehicle sensor is configured to photograph the periphery of the first vehicle.

3. The information processing apparatus of claim 1, wherein
the first vehicle is a vehicle parked in a predetermined area including the target vehicle among the parked vehicles.

4. The information processing apparatus of claim 3, wherein
the first vehicle includes a vehicle parked alongside the target vehicle in a longitudinal direction that is a direction of travel of the target vehicle.

5. The information processing apparatus of claim 4, wherein
the controller is programmed to select the first vehicle based on image information acquired by a target vehicle sensor provided on the target vehicle and to photograph the periphery of the target vehicle in a longitudinal direction.

6. The information processing apparatus of claim 4, wherein
the controller is programmed to select the first vehicle based on image information acquired by an installation type sensor configured to photograph the predetermined parking area and provided in the predetermined parking area.

7. The information processing apparatus of claim 3, wherein
the first vehicle sensor is configured to photograph the periphery of the first vehicle.

8. The information processing apparatus of claim 7, wherein the controller is programmed to:
select a second vehicle, which is a vehicle parked around the first vehicle and which differs from the target vehicle and the first vehicle, based on image information from the first vehicle sensor, and
issue a command to activate a second vehicle sensor provided in the second vehicle and to detect peripheral information of the second vehicle.

9. The information processing apparatus of claim 1, wherein
the controller is programmed to:
acquire a guidance route to the target vehicle for the user based on information detected by the first vehicle sensor, and
issue a command to activate a guidance means configured to guide the user along the guidance route, the guidance means being provided in a third vehicle, among parked vehicles parked in the predetermined parking area, which is a vehicle parked at a position where the user can be guided along the guidance route.

10. An information processing method executed by a computer, including:
acquiring a presence or an absence of a predetermined request from a user to parked vehicles parked in a predetermined parking area in which a plurality of vehicles are parked,
based upon a determination that the predetermined request from the user of the target vehicle has been acquired, identifying a target vehicle, which is a vehicle for which the predetermined request is made, among the parked vehicles;
based upon the identification of the target vehicle, selecting a first vehicle that is parked around the target vehicle in the predetermined parking area; and
issuing, based on the predetermined request to the target vehicle, a command to activate a first vehicle sensor of the first vehicle that was selected, wherein the first vehicle senor is configured to detect peripheral information of the first vehicle.

* * * * *